US012801137B1

(12) United States Patent
Park et al.

(10) Patent No.: US 12,801,137 B1
(45) Date of Patent: Nov. 17, 2026

(54) SYSTEMS AND METHODS FOR EFFICIENT NAVIGATION OF ROBOTIC DEVICES

(71) Applicant: North Carolina A&T State University, Greensboro, NC (US)

(72) Inventors: Hyoshin Park, Greensboro, NC (US); Larkin Folsom, Durham, NC (US); Justice Darko, Greensboro, NC (US); Masahiro Ono, Pasadena, CA (US); Kyohei Otsu, Pasadena, CA (US)

(73) Assignee: North Carolina A&T State University

( * ) Notice: Subject to any disclaimer, the term of this patent is extended or adjusted under 35 U.S.C. 154(b) by 555 days.

(21) Appl. No.: 17/467,046

(22) Filed: Sep. 3, 2021

Related U.S. Application Data

(60) Provisional application No. 63/074,889, filed on Sep. 4, 2020.

(51) Int. Cl.
*G05D 1/00* (2024.01)

(52) U.S. Cl.
CPC .................................. *G05D 1/0212* (2013.01)

(58) Field of Classification Search
CPC .... G05D 1/0212; G05D 1/644; G05D 1/2469; G05D 1/2464; G05D 2105/87; B60W 60/001; G06Q 10/047; G01C 21/3415; G01C 21/3804
See application file for complete search history.

(56) References Cited

U.S. PATENT DOCUMENTS 9,417,070 B1 * 8/2016 Herriot ................ G08G 5/0069
2003/0004777 A1 * 1/2003 Phillips .............. G06Q 10/0635 705/7.28
2004/0088107 A1 * 5/2004 Seligmann ............. G01C 21/36 709/224
2005/0055157 A1 * 3/2005 Scholl ................ B60K 31/0008 701/410
2005/0216182 A1 * 9/2005 Hussain ................. G01C 21/20 701/532
2013/0317667 A1 * 11/2013 Kruglick ................ G05D 1/101 701/2
2014/0018996 A1 * 1/2014 Mian .................... G05D 1/0212 701/26
2017/0199525 A1 * 7/2017 Albaghajati .......... G06T 11/206

(Continued)

OTHER PUBLICATIONS

Morris, J., et al. "Multivariate Analysis Versus Multiple Univariate Analyses," Psychological Bulletin, 1989 <https://www.researchgate.net/publication/232494414_Multivariate_Analysis_Versus_Multiple_Univariate_Analyses> (Year: 1989).*

*Primary Examiner* — Erin D Bishop
*Assistant Examiner* — Karen Lynelle Furgason
(74) *Attorney, Agent, or Firm* — Clements Bernard Walker; Christopher L. Bernard

(57) ABSTRACT

Systems and methods for generating a robot path for navigating a terrain are disclosed. The methods include receiving a spatial model of the terrain, identifying a plurality of paths between a start point and an end point on the terrain, identifying an optimal path from the plurality of paths using the spatial model, causing a robot to move from the start point to a grid cell on the optimal path, causing the robot to collect information about the grid cell, and updating the spatial model of the terrain using the collected information. The spatial model includes a grid comprising a plurality of cells, each cell having a travel time probability distribution.

17 Claims, 15 Drawing Sheets

(56) References Cited

U.S. PATENT DOCUMENTS

| | | | | |
|---|---|---|---|---|
| 2019/0025851 | A1* | 1/2019 | Ebrahimi Afrouzi | G05D 1/648 |
| 2019/0295003 | A1* | 9/2019 | Dronen | G05D 1/0221 |
| 2020/0117210 | A1* | 4/2020 | Ren | G08G 5/76 |
| 2020/0225673 | A1* | 7/2020 | Ebrahimi Afrouzi | G06N 5/04 |
| 2020/0310450 | A1* | 10/2020 | Reschka | B60W 60/0011 |
| 2021/0229656 | A1* | 7/2021 | Dax | G08G 1/09626 |
| 2022/0042821 | A1* | 2/2022 | Patterson | G01C 21/3841 |

* cited by examiner

Travel Time Grid

| | | | | | | | | | |
|---|---|---|---|---|---|---|---|---|---|
| [10, 10] | [2, 30] | [2, 30] | [5, 10] | [10, 30] | [5, 10] | [10, 30] | [5, 5] | [5, 30] | [2, 30] |
| [10, 10] | [2, 10] | [5, 30] | [10, 30] | [5, 10] | [2, 30] | [10, 30] | [2, 30] | [30, 30] | [5, 30] |
| [2, 30] | [2, 30] | [30, 30] | [5, 10] | [5, 30] | [10, 10] | [2, 5] | [2, 30] | [10, 30] | [10, 10] |
| [2, 5] | [10, 30] | [2, 10] | [5, 30] | [30, 30] | [10, 10] | [10, 30] | [2, 10] | [5, 30] | [2, 30] |
| [5, 5] | [10, 10] | [10, 30] | [2, 30] | [2, 10] | [5, 30] | [5, 30] | [2, 5] | [10, 30] | [5, 10] |
| [5, 30] | [5, 5] | [2, 10] | [5, 30] | [5, 5] | [10, 10] | [5, 5] | [2, 5] | [5, 5] | [5, 10] |
| [2, 2] | [10, 30] | [30, 30] | [2, 5] | [2, 30] | [5, 5] | [5, 5] | [2, 30] | [10, 30] | [2, 30] |
| [10, 30] | [5, 30] | [5, 30] | [2, 30] | [2, 2] | [5, 30] | [30, 30] | [10, 10] | [2, 2] | [2, 30] |
| [10, 30] | [2, 30] | [10, 30] | [5, 5] | [5, 5] | [2, 30] | [10, 30] | [2, 5] | [5, 30] | [10, 10] |
| [2, 2] | [5, 10] | [10, 30] | [2, 10] | [2, 5] | [2, 2] | [5, 30] | [5, 10] | [2, 10] | [2, 2] |

FIG. 5B

T1 Probability Grid

| | | | | | | | | | |
|---|---|---|---|---|---|---|---|---|---|
| 1.0 | 0.8 | 0.4 | 0.8 | 0.8 | 0.2 | 1.0 | 1.0 | 0.2 | 0.8 |
| 1.0 | 0.8 | 0.8 | 0.6 | 0.4 | 0.8 | 0.8 | 0.2 | 1.0 | 0.2 |
| 0.8 | 0.8 | 1.0 | 0.4 | 0.2 | 1.0 | 0.6 | 0.8 | 1.0 | 1.0 |
| 0.4 | 0.4 | 0.8 | 0.8 | 1.0 | 1.0 | 0.4 | 0.2 | 0.2 | 0.8 |
| 1.0 | 1.0 | 0.8 | 0.4 | 0.6 | 0.8 | 0.8 | 0.4 | 0.6 | 0.4 |
| 0.6 | 1.0 | 0.8 | 0.8 | 1.0 | 1.0 | 1.0 | 0.2 | 1.0 | 0.4 |
| 1.0 | 0.4 | 1.0 | 0.8 | 0.2 | 1.0 | 1.0 | 0.2 | 0.8 | 0.8 |
| 0.2 | 0.6 | 0.4 | 0.8 | 1.0 | 0.4 | 1.0 | 1.0 | 1.0 | 0.8 |
| 0.8 | 0.2 | 0.6 | 1.0 | 1.0 | 0.8 | 0.8 | 0.2 | 0.4 | 1.0 |
| 1.0 | 0.2 | 0.8 | 0.4 | 0.2 | 1.0 | 0.4 | 0.4 | 0.8 | 1.0 |

FIG. 5C

SYSTEMS AND METHODS FOR EFFICIENT NAVIGATION OF ROBOTIC DEVICES

PRIORITY TO RELATED APPLICATIONS

This application claims the benefit of U.S. provisional patent application No. 63/074,889 filed on Sep. 4, 2020 and titled "Systems and Methods for Efficient Robotics Navigation Through Global Mapping," which is incorporated by reference herein in its entirety.

STATEMENT OF RIGHTS TO INVENTIONS MADE UNDER FEDERALLY SPONSORED RESEARCH OR DEVELOPMENT

This invention was made with Government support under 80NM0018D0004 awarded by the National Aeronautics and Space Administration (JPL); 1910397 awarded by the National Science Foundation; and 69A3551747125 awarded by the U.S. Department of Transportation. The Government has certain rights in this invention.

BACKGROUND

Technical Field

This invention relates generally to autonomous robots and more specifically to autonomous robots for exploration of hazardous or inaccessible locations.

Description of the Related Art

Mission critical exploration of uncertain environments requires reliable and robust mechanisms for achieving information gain. Typical measures of information gain such as Shannon Entropy and Kullback-Leibler (KL) Divergence are unable to distinguish between different bimodal probability distributions or introduce bias toward one mode of a bimodal probability distribution.

Robotic reconnaissance operations are called for in potentially hazardous and/or inaccessible situations such as remote planetary surfaces, hurricanes, etc. One approach to reconnaissance operations is to use a few sophisticated, highly capable and reasoning surface-based reconnaissance craft (e.g., rovers). Such reconnaissance operations typically rely on previously existing information (e.g., satellite images of planets, hurricanes, etc.) to plan navigation paths, drop locations, etc. However, the amount and accuracy of such existing information is uncertain and often not known beforehand. In such highly uncertain environments, maximizing information gain is vital to ensuring safe, efficient, autonomous exploration (instead of choosing the fastest or safest route as the most optimal route).

For example, although the terrain, surface, and other irregularities have been comprehensively characterized for the earth, this is not true for other planetary bodies. As such, current rover path plans in the exploration of planetary bodies like Mars limit rover exploration to targeted regions of interest for which there is sufficient environment/terrain information available, while restricting spontaneous stops and leaving valuable data uncollected. Further, current path planning tools are designed for smaller terrains. However, often a rover is unlikely to stop for science in the primary mission because the rover will need to drive ~317 km in ~3150 sols to catch the return launch window. As such, with existing path planning algorithms, opportunities for data collection will be passed up or missed entirely. A technology to collect more valuable observations while carefully spending system resources will add significant value to the future rover missions, creating new opportunities to characterize the surface of astronomical bodies, reconciling the desire to explore further with the desire to explore in depth, and eliminating the dichotomy between engineering limitations and scientific discovery. The information of highest value in an uncertain environment is found in regions in which the rover's speed probability distribution has high standard deviation (SD).

Some navigation systems perform simultaneous localization and mapping (SLAM), also known in the field of computer vision as structure-from-motion (SfM). The mapping aspect relates to determining the locations of fixed landmarks or beacons in the environment while at the same time using sensor measurements from those fixed landmarks to assist in localization of the object. As an example, when a robot navigates an uncharted territory, such as in a Mars rover mission, or in an underground mining or undersea operation, the robot may determine its location relative to the surrounding environment. If a complete map of the terrain is not available in advance, the robot may observe landmarks, build a map based on the landmark observations, and determine its location on the map that it has constructed so far. The landmarks may be man-made markers or natural features of the terrain. SLAM is known in the art for building a map though exploration and exploitation. A terrestrial robot traveling from position A to position B under guidance (speed and direction/path) by an aerial robot has incomplete information regarding the surface it is traveling on. Generally, regions of the surface have been classified as "Risky" or "Not Risky" based on aerial images. This simple binary classification loses a lot of information—for example, a region may be judged 49% Risky (and therefore traversable), but more nuanced analysis yields more effective information.

Accordingly, improved systems and methods of collecting information in uncertain environments are desired.

SUMMARY

In certain scenarios, the present disclosure concerns implementing systems and methods for generating a robot path for navigating a terrain are disclosed. The systems may include a processor and a non-transitory computer readable medium including programming instructions that may be executed by the processor for performing the methods of this disclosure. The methods may include receiving a spatial model of the terrain, identifying a plurality of paths between a start point and an end point on the terrain, identifying an optimal path from the plurality of paths using the spatial model, causing a robot to move from the start point to a grid cell on the optimal path, causing the robot to collect information about the grid cell, and updating the spatial model of the terrain using the collected information. The spatial model may include a grid comprising a plurality of cells, each cell having a travel time probability distribution.

Optionally, the methods may also include generating an updated optimal path for the robot based on the updated spatial mode.

In various embodiments, the methods also include using the travel time probability distribution associated with each of the plurality of cells to determine at least one of the following: a minimum travel time for traversing that cell, a maximum travel time for traversing that cell, and a probability associated with either the minimum travel time or the maximum travel time. Optionally, the methods may include identifying, from the plurality of cells, one or more groups of correlated cells based on the minimum travel time, the maximum travel time, and the probability. Each of the one or more groups of correlated cells may include a subset of the plurality of cells that have identical minimum travel time, identical maximum travel times, and probabilities associated with either the minimum travel time or the maximum travel time that are within a threshold range. Additionally and/or alternatively, the methods may include using the collected information to update the spatial model of the terrain by updating the travel time probability distribution of the grid cell and one or more cells identified as being correlated to that cell.

In some embodiments, identifying the optimal path may include determining a utility function for each of the plurality of paths based on the spatial model as a measure of information that the robot will gain by visiting cells along that path, and identifying a path from the plurality of paths that maximizes the utility function. The utility function may include a reward component that is determined for each cell included in a path based on, for example, a number of correlated cells associated with that cell, an uncertainty associated with the travel time probability distribution of that cell, and/or a difference between the minimum travel time and maximum travel time associated with that cell. Optionally, the reward function may be determined for maximizing information gain early during traversal of the path. Additionally and/or alternatively, the utility function may also include a cost component that is determined by comparing a difference in expected travel times between that path and another path that has a fastest expected travel time between the start point and the end point.

In various embodiments, the spatial model may be received from another robot that has previously navigated the terrain and/or from image data associated with the terrain.

In certain scenarios, systems and methods for optimally gathering information about an environment are disclosed. The systems may include a processor and a non-transitory computer readable medium including programming instructions that may be executed by the processor for performing the methods of this disclosure. The methods may include receiving a spatial model corresponding the environment. The spatial model may include a grid comprising a plurality of cells where each cell is associated with an uncertainty corresponding to one or more features. The methods may further include clustering the plurality of cells into one or more subsets, each of the one or more subsets including one or more of the plurality of cells that each have the uncertainty within a threshold, causing a robot to travel to a first cell in the environment and collect information about the first cell. using the collected information to update the uncertainty associated with the first cell and at least one other cell included in a subset that includes the first cell, and updating the spatial model of the environment using the collected information. Optionally, the first cell may be selected to maximize a reduction in an overall uncertainty about the environment.

Examples of the environment include, without limitation, a hurricane, an extraterrestrial body, etc.

The methods may also include generating a path for the robot for traversing the environment based on a weighting function. Optionally, the weighting function may be based on a probability distribution of the uncertainty of each of the plurality of cells and an error associated with an initial state of each of the plurality of cells.

BRIEF DESCRIPTION OF THE DRAWINGS

The present solution will be described with reference to the following drawing figures, in which like numerals represent like items throughout the figures.

FIG. 5B provides minimum and maximum travel times associated with each cell in the grid of FIG. 5A; FIG. 5C illustrates the probabilities associated with the travel times.

DETAILED DESCRIPTION

Figure 1:
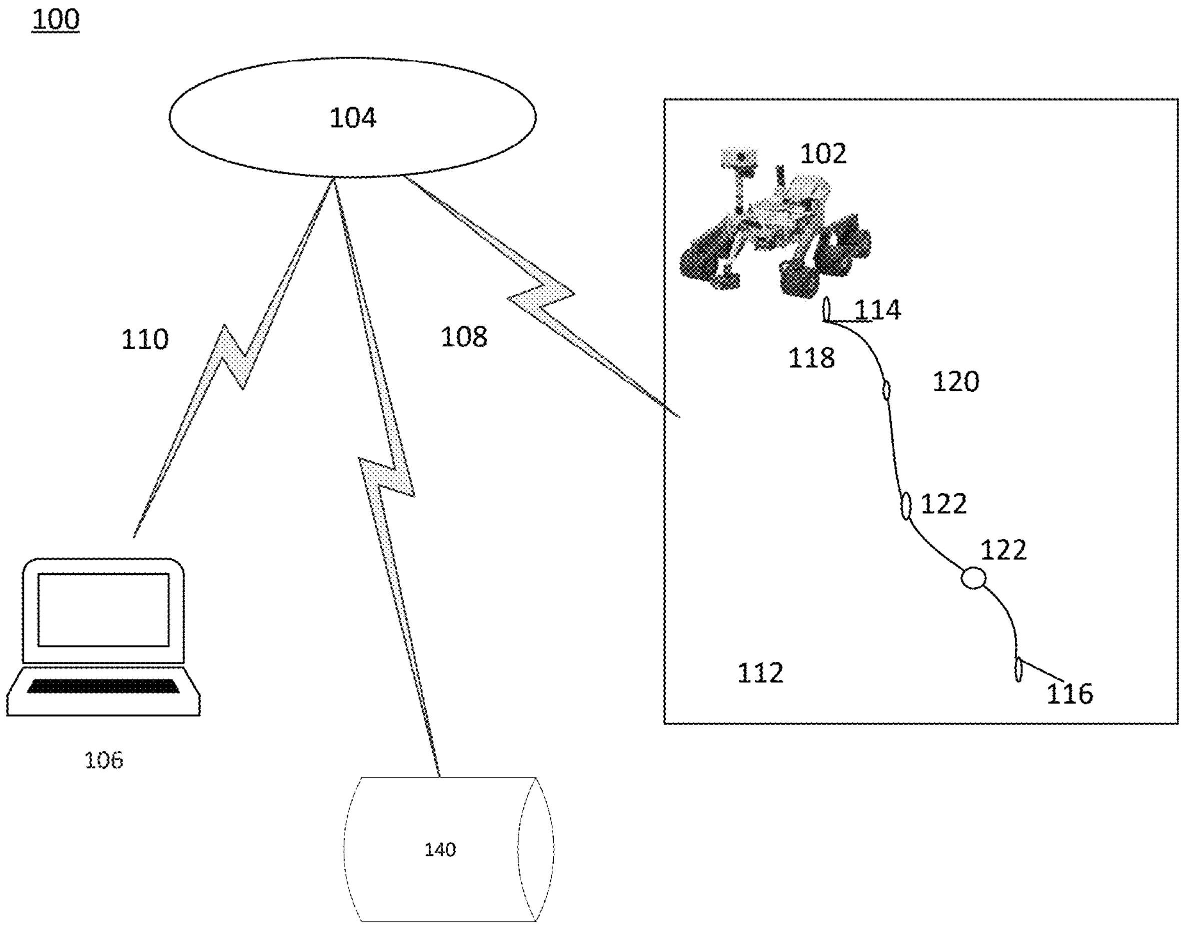
FIG. 1 is an illustration of a robot routing environment.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Definitions for additional terms that are relevant to this document are included at the end of this Detailed Description.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The term "robot" refers to a self-propelled object that can navigate in an autonomous, semi-autonomous, and/or manually controlled manner, and is powered by any form of energy. The term "robots" includes, but is not limited to, vehicles (such as cars, trucks, vans, trains, autonomous vehicles), aircrafts, aerial drones, mobile robots for use in automated floor cleaners, humanoid robots, robots for experimentation and lab use, robots for delivering supplies, astronomical robots (e.g., planetary rovers), hurricane explorers, shopping carts, and the like. A rover or a planetary rover is a robot having a processor, programming instructions and drivetrain components that are controllable by the processor without requiring a human operator. It will be understood by one of ordinary skill in the art that robots can be embodied in a variety of forms. In these variety of forms, a robot may be referred to by a different name, such as by a function that is performed by the robot.

In this document, when terms such as "first" and "second" are used to modify a noun, such use is simply intended to distinguish one item from another, and is not intended to require a sequential order unless specifically stated. In addition, terms of relative position such as "vertical" and "horizontal", or "front" and "rear", when used, are intended to be relative to each other and need not be absolute, and only refer to one possible position of the device associated with those terms depending on the device's orientation.

For sequential decision problems under uncertainty, optimal planning and learning algorithms maximize the reward gain by knowing more useful information. Formulating a cost function with an appropriate valuation of information is necessary when knowledge of information in one time and/or space gives conditional attributes of information in another time and/or space. In highly uncertain conditions, this reduction of entropy is vital to robust, efficient, exploration of a grid map, wherein the exploration can optionally be completed using autonomous vehicles.

As disclosed herein, maximizing information gain by traveling unchartered territory can be accomplished using autonomous and connected robots. Under strict limitations of time and energy, in one variation, the system disclosed herein collects and transmits the most data possible from new, dynamic environments. One intelligent system of the present disclosure finds the best paths of robots, drop-off locations of drones, etc. using autonomous decision-making, guided by desired levels of exploration and risk, as well as energy constraints. In one scenario, when an autonomous robot travels across a grid, information is gained by (1) defining "correlated cells" as cells of the grid with similar state (e.g., travel time probability distribution in case of planetary rovers, uncertainty associated with travel path/wind speed in case of drones deployed in a hurricane, or the like), where the state of the correlated cell is assumed to be unknown until one of them is visited; (2) visiting unclassified or uncertainly classified cells; (3) observing the condition in those cells, and (4) estimating the entropy (degree of disorder or randomness) in other cells. If the assumption that the cell states are correlated is true, then visiting one cell within the group will fully reveal the state of all cells that share the same state and/or visiting several cells within the group sequentially will partially reveal the state of the all cells that share the same state. As such, instead of modeling entropy as a binary state (e.g., occupied or clear), the proposed disclosure comprises developing a new information flow framework to integrate different sources of partial entropy toward spatiotemporal information gain of a partially correlated grid, nearby grid with a sight radius, and measure of variation in the correlation.

In various embodiments, the process may include determining spatiotemporal network correlation between cells within a configuration space that have a multimodal distribution determined based on granular microscopic data collected from multiple sources (e.g., remote sensing from satellite images, in-situ sensing from robots or drone, etc.). The global and local posterior gains from new observations (collected by robots) may be estimated by updating the prior distribution of correlated cells. The global correlation between non-contiguous cells of an entire map of the configuration space may be estimated by using an expectation maximization algorithm on their multimodal mixture distributions. Additionally and/or alternatively, the local and temporal correlation may also be estimated using a Local Global Unscented Transform (UT) Kalman Filter. The output of Kalman Filter may be estimated event network and/or multimodal nested sampling. Information gained at the exploration of a cell may be used to update the posterior distributions of all correlated cells. Specifically, this process will improve the state estimation of unobserved locations in a hurricane when navigating environments in which prior belief information is provided but contains high uncertainty.

In some example embodiments, the methods disclosed herein can be used to map an unknown terrain, such as for example, Mars or terrestrial areas, congested traffic networks in an urban, suburban, or rural areas. As discussed above, previous path planning methods for interplanetary rovers have focused on minimizing risk to the rover by not visiting highly uncertain, low-confidence regions, but the potential exists for these regions to be traversable. Scouting these regions may offer significant travel time savings under certain conditions. The path-planning methods of the current disclosure can improve efficiency by considering defined trade-offs, such as between energy, time and environmental challenges. In one variation, the system of the present application allows robots to analyze paths as they drive, reporting information about the paths most likely to be hazard-free, thereby making the most efficient use of energy and maximizing the travel distance.

In certain embodiments, the system may include multiple robots and each robot may update its path plan every time it moves to a new cell, in addition to sharing information about the visited cell with all other robots in the system. By sharing information about the states of the cells, improved parameters can be used in the path-planning of all robot journeys. If a cell is visited by another robot and found to be in the same state as the original cell of that type, then all robots have confirmation that these cells are correlated. The robots gather and confirm data during their journeys, updating the collective knowledge bank as new information about the terrain is discovered.

In one or more scenarios, the system of the present application uses drones to maximize data collection and identify potential flight paths in future storms, such as hurricanes. In this system, early measurements corresponding to when a hurricane is forming (e.g., from satellite data) are used to determine the storm's wind-field and other important data (e.g., hurricane path and wind intensity) using a hurricane prediction model that predicts hurricane path and wind intensity. However, predicted path and wind intensity are associated with uncertainties at various locations, and such locations may be used in accordance with the current system and method to identify drop locations for drones. The drones may then communicate with other drones, a base (e.g. a plane) and/or other remote computing devices to effectively collecting and transmit as much data as possible. The collected data may be used to reduce uncertainties about the data collection location as well as other locations within the hurricane that are related to the collection location (based on an uncertainty probability distribution). The collected data may, therefore, be used to update the determined path and intensity of wind as well as the boundaries and structures of the hurricane.

As disclosed herein in certain scenarios, multi-robot energy-aware autonomous path-planning determines paths that achieve the objective-state of each robot within a defined energy limit, while avoiding unyielding obstacles. Contributions to the uncertainty of path costs can be categorized by energy and time dependency. The present application uses variable surface probabilities in decision making in stochastic time-dependent path finding.

With reference now to the figures, and in particular with reference to FIG. 1, a diagram illustrating a robot routing environment is depicted in accordance with an advantageous embodiment. Robot routing environment 100 includes robot 102, communications node 104, and computing device 106. Robot 102 may communicate with communications node 104 through communications link 108. Computing device 106 may communicate with communications node 104 through communications link 110. With these communications links, information may be transferred between robot 102, communications node 104, and computing device 106. Optionally, the system may also include one or more data store(s) 140 configured to store various information such as a spatial model, various path input parameters, a robot model, characteristics of the robot, environmental information, or the like.

In these illustrative examples, robot 102 is located on terrain 112. Robot 102 may take various forms. For example, robot 102 may be, without limitation, a lunar rover, a planetary rover, a land-based spacecraft, a tank, a personnel carrier, some other mobile land-based platform, or an aerial drone (in which the terrain may not be present or may be representative of the environment in which the aerial drone will fly). In these examples, terrain 112 may be located on a body such as, for example, without limitation, the moon, the earth, Mars, an asteroid, or some other suitable body.

Robot 102 may travel from start point 114 to end point 116. Robot 102 may travel from start point 114 to end point 116 through path 118. Path 118 also includes way points 120, 122, and 124 in these examples. A way point is an intermediate point along path 118 between start point 114 and end point 116 (e.g., grid cells discussed below).

Further, robot 102 may communicate with communications node 104 and/or computing device 106 during movement on path 118. The planning of path 118 may be performed through various data processing systems that may be located on robot 102, in communications node 104, and/or in computing device 106. Communications node 104 may be, for example, a satellite, a spacecraft, or a building or another robot located on terrain 112. Further, computing device 106 may be located on a spacecraft, a satellite, or on another planetary body. For example, if terrain 112 is located on the planet Mars, computing device 106 may be located on the Earth.

Existing routing solutions or processes are built for low-speed rovers that are designed for smaller terrains, and generate paths that avoid waypoints associated with uncertainties or limited information (e.g., relating to terrain features, gravity, etc.). Although these types of systems may take into account terrain data, they are not designed for long-distance paths at speeds for exploring uncertain regions over longer distances. Further, currently available routing systems do not optimize energy management while allowing the robot to explore various waypoints about which uncertain or limited information is available.

Thus, in a manner that takes into account terrain and other factors, the current disclosure provides the ability to path robot 102 from start point 114 to end point 116 including way points 120, 122, and 124. Path 118 may be generated in a manner that meets various parameters to reach end point 116. For example, these parameters may include constraints regarding the terrain, energy management, and exploratory way points.

A method, apparatus, and computer program code is present for generating a path for a robot, such as robot 102. A start point and an end point are identified for the robot. A spatial model of terrain encompassing the start point and the end point is identified to form an identified spatial model. A path is generated for the robot from the start point to the end point using the identified spatial model and based on a cost to traverse a grid point within a grid in the spatial model to meet a number of criteria for energy management of the robot.

In various embodiments, when terrain 112 takes the form of terrain on a body such as, for example, the planet Mars, the routing of robot 102 may be performed using a model of terrain 112, a model of the robot 102, input parameters, and a program that may perform routing. This type of process, as well as other routing processes, may be used to generate path 118 in accordance with the disclosure.

The various routing processes may be located within robot 102, communications node 104, computing device 106, and/or some other suitable device or object. This routing process may be distributed among different components or located in a single component.

The illustration of robot routing environment 100 in FIG. 1 is not meant to imply physical or architectural limitations to the manner in which a robot routing environment may be implemented. In various embodiments, robot routing environment 100 may include other components in addition to or in place of the ones illustrated in FIG. 1. For example, additional communication nodes may be present in addition to communications node 104. In some embodiments, computing device 106 may be absent. In some embodiments, additional rovers may be present for which routing is performed to path those robots between start and end points on terrain 112.

Figure 2:
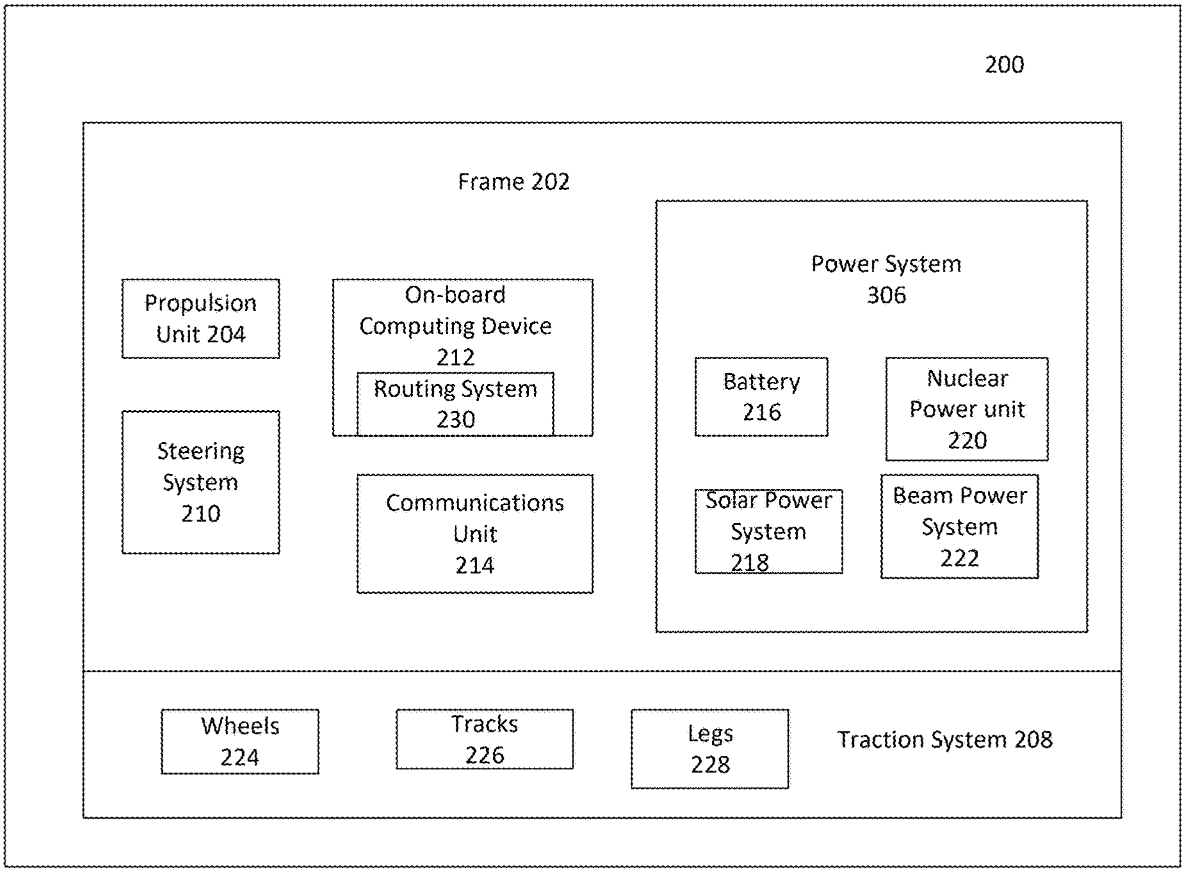
FIG. 2 is an illustration of an architecture for a robot.

With reference now to FIG. 2, a diagram of a robot is depicted. In this example, robot 200 is an example of robot 102 in FIG. 1. Robot 200 includes a frame 202, a propulsion unit 204, a power system 206, a traction system 208, a steering system 210, an on-board computing device 212, and a communications unit 214. Optionally, the robot may also include a controller (not shown here) for controlling the operation of various systems such as the traction system, the steering system, etc. based on, for example, instructions received from the on-board computing device.

Frame 202 forms the structure around which various components may be placed and/or attached for robot 200. Propulsion unit 204 provides the engine and/or power plant to move robot 200. Propulsion unit 204 provides the capability to generate mechanical energy to power traction system 208.

Power system 206 provides the power to propulsion unit 204 used to generate the mechanical energy. Power system 206 also provides energy to power various components for robot 200. These components include, for example, without limitation, steering system 210, on-board computing device 212, communications unit 214, and any other suitable components that may require power. In these examples, power system 206 may take various forms.

Power system 206, in these examples, contains at least one of battery 216, solar power system 218, nuclear power unit 220, beam power system 222, and any other suitable power system.

Battery 216 may store energy for use by propulsion unit 204, as well as providing power to other components. Solar power system 218 may generate power for use by various components within robot 200 in response to being illuminated through solar exposure. Further, solar power system 218 also may generate energy that is stored within battery 216.

Nuclear power unit 220 can provide an independent source of energy that does not rely on exterior environmental factors, such as illumination from solar exposure. Beam power system 222 may receive energy in the form of microwave and/or laser beams. For example, beam power system 222 may receive a microwave or laser beam from a satellite or other source. This energy may then be turned into electrical power for storage in battery 216.

Traction system 208 provides the capability to move robot 200 over different types of terrain. Traction system 208 may take various forms. For example, without limitation, traction system 208 may include wheels 224, tracks 226, and/or legs 228. Optionally, the robot 200 may be able to navigate at a height above a terrain (e.g., fly, hover, etc.) and include the appropriate components. Steering system 210 provides a capability to steer or change the direction of robot 200 during movement.

The on-board computing device 212, in these examples, executes various processes for operating robot 200. These processes may include, for example, obtaining data and/or performing routing. Routing may be performed using routing system 230 in these examples. Routing system 230 provides a capability to generate paths for robot 200. Routing system 230 may be a number of different software components.

Routing system 230 may generate a path from a start point to an end point that meets various parameters. These parameters include, for example, total trip time, required line of sight to a communications node, information to be gathered, uncertainty about grid cells, energy usage, speed, and other suitable factors (discussed below in more detail).

Communications unit 214 may provide a capability to exchange information with other objects, such as communication nodes, computing devices, rovers, spacecraft, and/or other suitable objects. In various implementations, communications unit 214 may require a line of sight. Communications unit 214 may use various mechanisms such as, for example, microwave transmissions and/or laser beam transmissions to exchange information.

The illustration of robot 200 in FIG. 2 is not meant to imply physical or architectural limitations to the manner in which various robots may be implemented. For example, robot 200 may include components in addition to or in place of the ones illustrated. As one example, robot 200 also may include instruments and/or sensors to obtain information about the terrain and environment around the robot. For example, drones deployed within a hurricane can include pressure, temperature and humidity (PTH) sensors to capture atmospheric profiles and thermodynamic data. In yet other embodiments, robot 200 also may include a cargo area to carry cargo.

In various embodiments, robot 200 may be completely autonomous, partially autonomous, or a manned robot. In yet other embodiments, routing system 220 may be located on another component such as, for example, a remote computer. With this type of embodiment, robot 200 receives paths through communications unit 214 and executes the path using on-board computing device 212.

Figure 4:
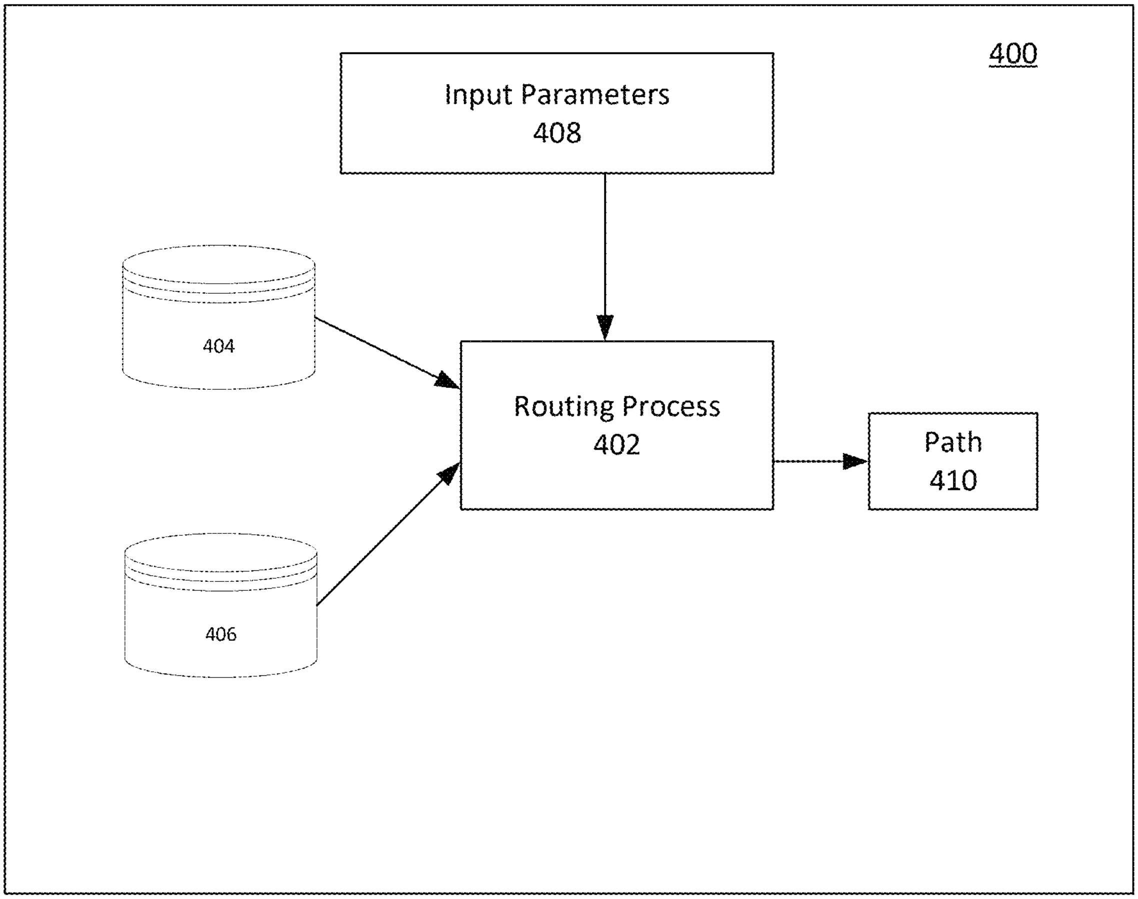
FIG. 4 is an illustration of a routing system.

With reference now to FIG. 4, a diagram of a routing system is depicted in accordance with an advantageous embodiment. Routing system 400 is a more detailed example of an implementation of routing system 230 in FIG. 2.

Routing system 400 includes routing process 402, spatial model 404, and robot model 406. In these examples, routing process 402 may receive input parameters 408 to generate path 410 using spatial model 404 and robot model 406.

Figure 3:
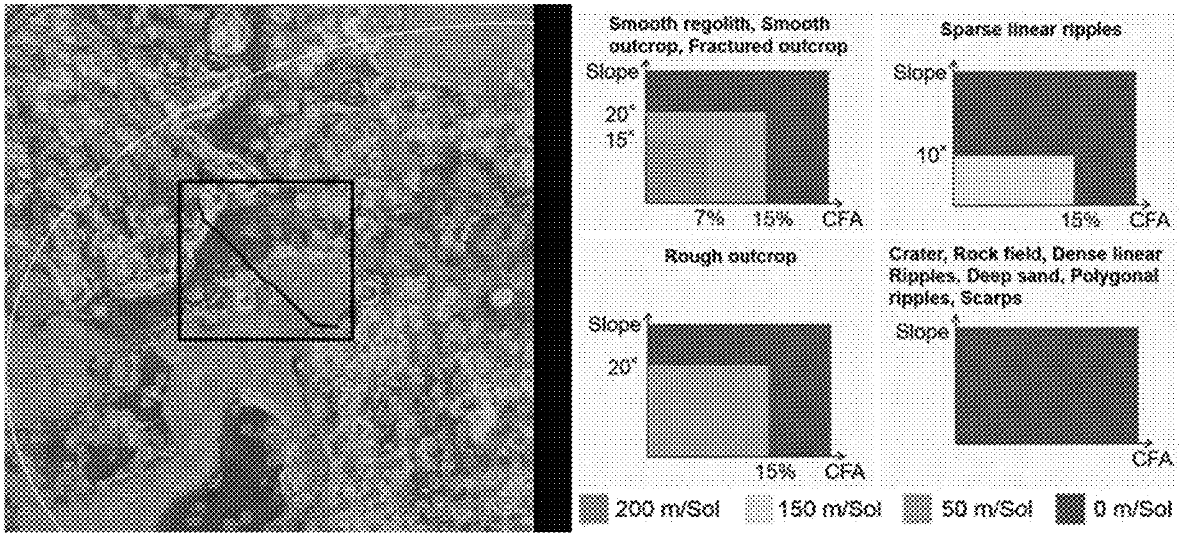
FIG. 3 is an illustration of an example spatial model providing information about terrain.

In these examples, spatial model 404 may be a model of the terrain over which the robot is to travel. Spatial model 404 for Mars may be derived from, for example, existing data about the terrain (e.g., satellite images of planets) or the configuration space (e.g., satellite images of a hurricane). For example, for Mars the spatial model may be determined using information about terrain type determined using the Soil Property and Object Classification (SPOC) terrain classifier (Rothrock et al. 2016), slope data from a Digital Elevation Model (DEM) generated using HiRISE stereo images (McEwen et al. 2007), and rock abundance in terms of the Cumulative Fractional Area (CFA) covered by rocks (Golombek et al. 2012) model providing information about terrain (illustrated in FIG. 3). Similarly, other publicly available information may be used for determining the spatial model for different types of terrains. The spatial model 404 may also contain information about illumination, energy management for tracking the amount of energy or energy levels for the robot, and/or other environmental factors in the area of the terrain. The spatial model 404 may also include other information such as, without limitation, description or information about foliage, ice, or other features that may be present in the terrain.

Figure 5A:
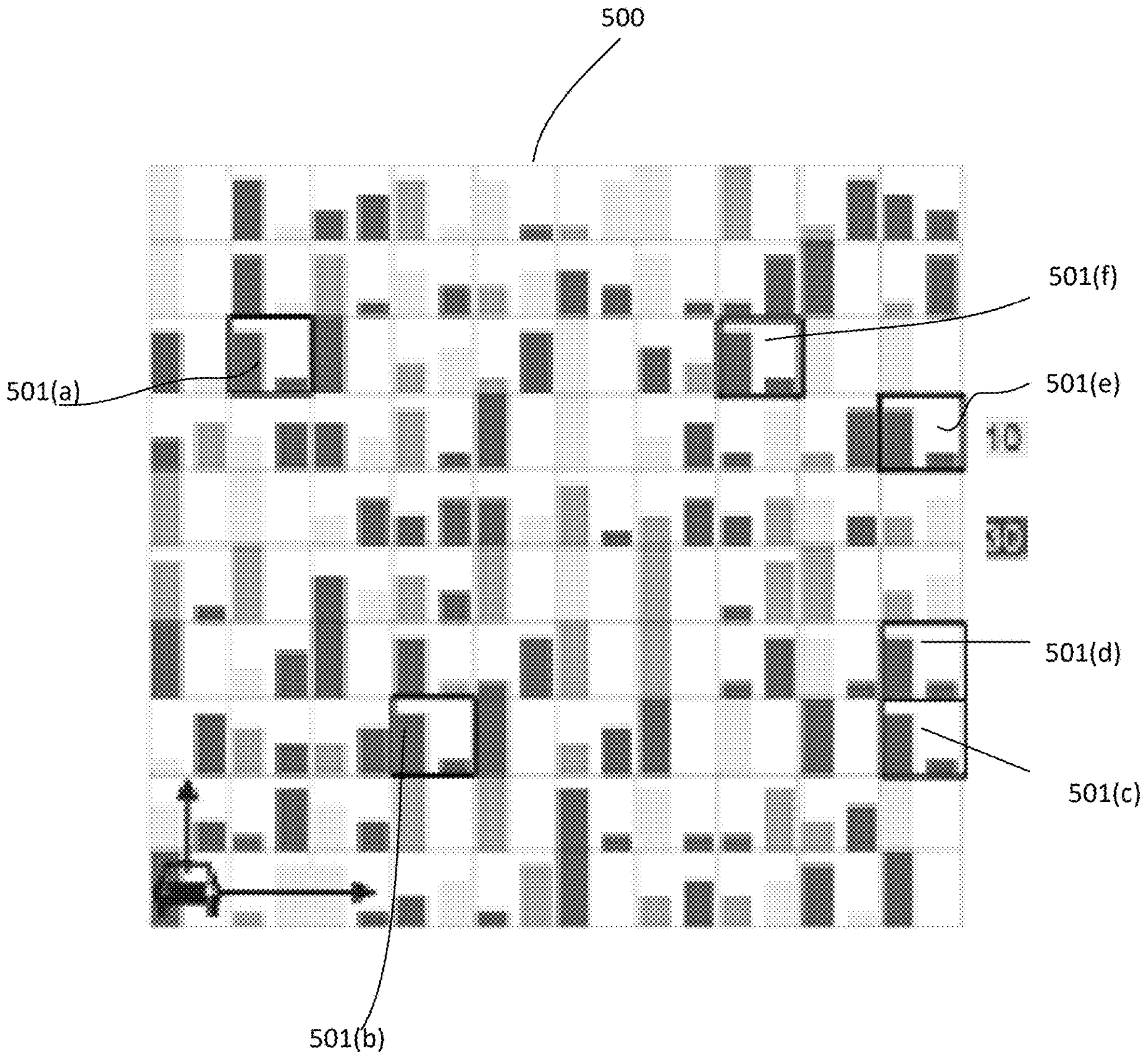
FIG. 5A illustrates a grid corresponding to a terrain.

In various embodiments, the spatial model may include one or more grids, where each grid comprises a plurality of interconnected cells in the form of polygons (e.g., squares hexagons, octagons, or some other suitable polygonal shape). Each grid cell will contain the unique probabilistic distribution of travel time for formulating the best options to travel with partial, sequential, and/or mixture of information gain, with multiple-univariate and multivariate distributions. Specifically, as shown in FIG. 5A, the terrain map may be represented as an N×N grid 500 having a probability distribution of travel times in each cell, and the robot may move in four directions: up, down, left, and right (while diagonal moves are not allowed). Cells in the grid may be numbered row-wise (and/or column-wise), starting with zero for the first cell. Grids are used because the prior state of the terrain map is typically defined using image analysis and is represented as the state of a region using pixels of a fixed size. The use of a grid structure enables the spatial model to be applied to images of the region. For example, for planetary exploration, each grid cell may represent one pixel from 3D stereo satellite imagery of the astronomical object's surface.

In certain embodiments, a binary travel time probability distribution may be assumed with a single robot and no time-dependence of the grid. In such embodiments, each grid cell contains three values corresponding to the state of that cell: the minimum and maximum possible travel times to traverse that cell (FIG. 5B), and probability that the first travel time is the true travel time (FIG. 5C). The possible travel times through each grid cell in the example shown in FIG. 5B are 2, 5, 10, and 30 minutes. The third value in each grid cell is the probability, P(T1), of one of the two time values. The probability of the other time value is implicitly defined as (1−P(T1)). These probabilities are represented as real numbers between 0 and 1 in the model.

The system may determine the travel times and associated probability distribution/probabilities based on information available about the cell such as, for example, terrain type, CFA, and slope for interplanetary observations. For example, for a planetary terrain the initial state of each grid cell is defined by four variables obtained from satellite data, with the fourth variable being used to calculate the distance between any two points. These are the slope, the terrain type probability distribution in FIG. 3, the cumulative fractional area (CFA) of rocks, and the elevation. Taking Mars as an example, there are 11 possible terrain types which are classified using the Soil Property and Object Classification (SPOC) algorithm (Rothrock et al. 2016). SPOC generates a probability distribution over the 11 terrain type classes. Because SPOC is a machine learning algorithm working with image data, most grid cells have some uncertainty in their terrain type classification. This information may be used to determine expected robot speed probability distributions through each cells, and subsequently the travel time probability distributions for each cell using any now or hereafter known techniques.

In various embodiments, the cells of the grid may be grouped into different types (i.e., determined to be correlated) based on their corresponding minimum and maximum travel times and associated probabilities. When determining whether or not cells are correlated, the probability distribution of the travel times within the cells must be considered. For example, if "cell 1" has travel times [2, 30] and probabilities [20, 80], while "cell 2" has travel times [2, 30] and probabilities [80, 20], the two cells are not considered to be correlated. The cells must have the same travel times and their probability distributions must be within a threshold in order to be considered of the same type or correlated. For example, in FIG. 5A, cells 501_a-f_ are determined to be correlated.

Robot model 406 is a model that is specific for the robot being routed. In routing system 400, robot model 406 provides an identification of information used by routing process 402. This information includes, for example, speed, energy usage, and other suitable information. Robot model 406 may generate this information based on the location of the robot within spatial model 404. For example, terrain and illumination identified in spatial model 404 may be used to identify the energy usage, energy creation, and/or energy storage for robot model 406. Optionally, terrain may include, for example, gradient and surface conditions. The interaction of the robot with the gradient may result in a forward slope and/or side slope. The energy usage of a robot may vary depending on the terrain. This type of function may identify the amount of energy used, depending on the type of terrain for use in calculating costs and identifying a path for the robot.

Input parameters 408 may be input by an operator, obtained from a file, and/or received from some other source. In the illustrative examples, input parameters 408 include information such as, for example, a start point, an end point, a total trip time, a minimum speed required, a maximum speed, and/or some other suitable parameter. These parameters may include those for a particular mission. For example, a particular mission may involve carrying perishable items that may require delivery of the items to the end point by a certain total trip time. With this example, input parameters 408 may include a start point, an end point, and a total required trip time. The input parameters 408 may, in another example, include the desired uncertainty in the spatial model.

In these examples, routing process 402 includes a grid based routing that takes into account, for example, the expected travel time in association with the reward and cost components associated with traversing a grid cell. Specifically, the routing process 402 may generate a path for moving the robot from a start point to an end point such as, for example, start point 114 and end point 116 in FIG. 1 taking into account information gain, energy expenditure, clustering of cells, uncertainty associated with cells, different types of cells, or the like.

Specifically, the routing process 402 may include using the spatial model, the robot model, and the input parameters to generate a path moving the robot from a start point to an end point. For example, the process may include calculating all possible paths (including paths that visit every grid cell) between two points through the spatial model grid using, for example, depth first search for smaller grids, stochastic methods (e.g., random search or sampling-based approach such as Rapidly-exploring Random Trees (RRTs)) for large grids, or any now or hereafter known path calculation algorithms. Optionally, the input parameters and/or the robot model may be used to limit the maximum length of paths. For example, the minimum path length for an N×N grid is given (2N−2), and the input parameters may restrict the path length for grids over a threshold size to a value close to (2N−2) to allow for faster compute times. In addition, the input parameters may provide the number of robots, time-dependence of the grid, etc. For example, the process may determine all possible paths between the two points for a single robot (i=1), assuming a binary travel time probability distribution for each cell, and no time-dependence of the grid (t=1).

Once all paths have been generated, the process may identify, for each path, three travel times: the minimum travel time, the maximum travel time, and an expected travel time. The system may determine the maximum travel time for a given path as the sum of the maximum travel time through each cell in that path. The system may determine the minimum travel time for a given path as the sum of the minimum travel time through each cell in that path. The expected travel time (ETT) may be determined based on the probability information included in each cell as follows:

$$ETT=\sum_{j=1}^{j}\sum_{y=1}^{y}[P_{j,y}T_y] \quad (1)$$

where $P_{j,y}$ is the probability of the cell j being type y, $T_y$ is the travel time through a cell of type y, and Y is the total number of cell type.

Next, the process determines, for each path, a utility function as a measure of the information that a rover would gain by visiting cells along that path. The utility function ($U_t^i$) may be defined as follows:

$$U_{i,p,t} \blacksquare W_{1,i} * \mathrm{reward}_{i,p,t} - W_{2,i} \mathrm{cost}_{i,p,t} \tag{2}$$

where, $W_{1,\ i}$=Weight of the reward component for information gain from visiting a cell along the path;

$W_{2,\ i}$=Weight of the cost component for information gain from visiting a cell along the path;

$\mathrm{Reward}_{i,\ p,\ t}$=Reward component for information gain;

$\mathrm{Cost}_{i,p,t}$=Cost component for information gain.

Due to uncertainty in the environment, the agent should explore to gather information rather than naively following the route which is expected to give the fastest travel time. This incentive to explore and gather information is specified by the above utility function. Balancing the trade-off between reward (information gain) and cost (increased travel time) determines which routes to take. The two weighting variables, $W_{i,1}$ and $W_{i,2}$ are used to alter agent i's exploration preferences and approximate the normalization of the cost and reward variables, which are in different units (the weighting variables may be user defined).

The reward component for a given cell may be defined or computed in terms of the information gained by visiting that cell. For example, consider an environment including three terrain types which would result in a grid which contains cells of type 1, type 2, and type 3. If the robot visits a cell of type 1 and determines a state of that cell, then it can determine the state of every other type 1 cells. For example, if a robot visits a cell initially classified as type 1 and finds it to be of terrain type 2, then it has new information regarding every other cell initially classified as type 1. As such, the reward component for a type 1 cell may be based on one or more factors such, without limitation, the total number of type 1 cells in the grid, the amount of information already available for the type 1 cells, difference between the minimum and maximum travel times for a type 1 cell, or the like. In a highly correlated grid, not all cell exploration is equally valuable because some cells contain more information than other cells. This is due to each cell's potential for variance from the ETT and its correlation with other cells in the grid.

For example, if there are an equal number of cells of each unique type in the grid, then the reward component for a cell will increase with an increase in the difference between the maximum and minimum travel times associated with that cell because knowledge of the true state of a cell with a large difference between the maximum and minimum travel times is considered more valuable when selecting a path than knowing the true state of a cell with a small difference between the maximum and minimum travel times. The larger this difference, the greater the reward for visiting that cell. Therefore, the reward is weighted by the difference in travel times (T2−T1).

In another example, if the number of cells of each unique type is different, then the abundance of cells of each type is also considered. If there is only one cell of a given type in the entire grid, then knowing its state does not provide as much information gain as knowing the state of a cell which has four other identical cells in the grid. Equation 3 below shows how the number of cells of a given type is taken into account (provides a measure of the information gained by visiting a particular cell):

$$\mathrm{reward} = \frac{n_y}{N} \tag{3}$$

where $n_y$ is the number of cells of type y and Nis the total number of cells in the grid.

In yet another example, since the information gained about the state of a cell is used to determine the information about the other cells of the same type, the reward component also considers the amount of information and/or uncertainty about the information about a type of cells. The reward component for a type of cells increases with increase in uncertainty and/or decrease in available information about a type of cells (discussed below with respect to equation 8).

The cost component may be computed for a given path as a whole (instead of for each cell) by comparing the difference in expected travel times between that path and the path that has the fastest ETT (the "fastest ETT" path). If there is a large increase in travel time compared with the "fastest ETT" path, then the cost for that path increases. The cost may be weighted by a simple constant based upon the size of the grid. Specifically, the weight may be defined as:

$$\mathrm{cost}_{i,p,t} = \mathrm{ETT}_{i,detour,t} - \mathrm{ETT}_{i,fastest,t} \tag{4}$$

where, $\mathrm{ETT}_{i,fastest,t}$ is the fastest expected travel time, $\mathrm{ETT}_{i,detour,t}$ is the travel time of the path for which the Utility Function is being calculated.

Equation 4 becomes negative when the fastest ETT path has a higher travel time than the detour path. By subtracting a negative value, the utility function (Equation (2)) is increased, and this type of path is given more incentive. If the detour takes longer than the fastest ETT path, then the utility function is reduced. The extent of this increase or decrease is controlled by the weighting variable $W_{2,i}$ such that the cost for taking a path is, therefore, defined by the additional ETT incurred by taking that path versus the path with the fastest ETT. As such, the weighting variable $W_{2,i}$ in Equation 5 depends upon the difference in travel times for the fastest path and the detour path. This variable serves to prevent costfrom scaling with grid size, since the reward does not.

$$W_{2,i} = W_{cost,i} = \frac{1}{N} \tag{5}$$

In addition, the optimal path in terms of information gain may be the path which allows the robot to gain the most information about the state of the grid cells in the shortest number of steps. The most optimal path should consider how quickly the information is gathered. There are many paths which gather all of the information, but very few gather information as quickly as possible. As such, in some embodiments, in order to disincentivize collecting rewards later during path traversal, a "discount factor" (**2*k***) may be used, where k is the number of discrete steps taken along the path. A typical value used in this model is A=0.98, however this value can be adjusted to achieve the desired amount of exploration, with lower λ values making exploration less rewarding to the agent. The cost for taking a path is defined by the additional ETT incurred by taking that path versus the path with the fastest ETT. The utility function for agent i is now defined by Equation 6, where p is a unique path.

$$U_{i,p,t} = \mathrm{reward}_{i,p,t} - W_{2,i} \mathrm{cost}_{i,p,t} \tag{6}$$

where, the path reward is:

$$\mathrm{reward}_{i,p,t} = \sum_{j=0}^{End}\left[\frac{W_{1,j}^{k} \lambda\, n_{y,j,t}(T_{max,j,t} - T_{min,j,t})}{N}\right] \tag{7}$$

where, j is a cell in the path, $n_y$ is the number of cells of a given terrain type, N is the total number of cells, $T_{max,j,t}$ is the greater of the two times in the binary travel time cell at time t, $T_{min,j,t}$ is the lesser of the two times in the binary travel time cell. The weighting function of Equation 7 is shown in Equation 8 and is derived from a probability-based calculation in order to further improve the likelihood of choosing the best route, and is therefore included in the path reward to take the probability distribution into account. The probability component of the utility function is taken from the representation of probability distributions of the state of the cell in terms of their entropy.

$$W_{1,j} = \left[\log_2\left[\frac{1}{\text{Max}[P_{j,t}(T_{min,j,t}),\ 1 - P_{j,t}(T_{min,j,t})]}\right]\right] \quad (8)$$

Specifically, the state of a cell may be known beforehand based on, for example, satellite images of a terrain, remote and in-situ sensor measurement of a hurricane, or the like. However, such information or state of a cell may be associated with uncertainties based on, for example, sensor resolution, environmental conditions, inaccuracies or errors in the model used to analyze the images, sensor data, etc.; or the like. Taking into account the uncertainty about the state of a cell will ensure that a cell with the higher uncertainty is given a higher reward in order to resolve the uncertainty when the robot visits that cell. In other words, discrepancies may exist between the predictions made using satellite image analysis (based on satellite images of a terrain) compared to the actual conditions on the terrain leading to uncertainties in the state of a cell. Therefore, a probability distribution of the uncertainty related to a cell may be considered to further improve the likelihood of choosing the best path, and therefore the reward takes the probability distribution into account based on weighting function of Equation 8.

In certain scenarios, the extent of such discrepancies are not known beforehand, and therefore the accuracy of the probability distribution should also be defined. The accuracy of the probability distribution is, therefore, represented by an error term shown in Equation 9 below. Once a cell of a given type is visited, the state of all cells of the same type may be assumed to be known within some error. This error term, $\epsilon$, is reduced as subsequent correlated cells are visited and found to be in the same state as the first cell of that type. The error grows if subsequent correlated cells are visited and found to be in a different state than the first cell of that type. The reward is increased when the cells are found to have been correlated, and is decreased when the cells are found to not be correlated. Because the error is not assumed to be identical for all cells, it can only be improved when visiting a cell of the same type after visiting a cell of that type initially. A single sample from a probability distribution cannot confirm the shape of the distribution. In order to reduce the error, re-sampling cells with the same probability distribution is performed.

$$W_{j,1} = \left[\log_2\left[\frac{1}{\text{Max}[P_{j,t}(T_{j,1,t}),\ 1 - P_{j,t}(T_{j,1,t}) + e]}\right]\right] \quad (9)$$

During path planning, instead of including a direct reward for including in the path a cell which is identical to one which it has already been included, an indirect reward for including cells of the same type as a previously included cell may be included in the form of updating the error term. The error term is, therefore, included as an addition to the probability component of the reward (Equation 9).

When the uncertainty in a grid is a simple binary probability, such as a grid whose cells are either "blocked" or "clear", the entropy of an individual cell can be described using the Shannon Entropy in Equation 10. The probability that a cell is clear is given by p (c) and the probability that the cell is blocked is (1−p(c)).

$$H_C(c) = -p(c)\log_2[p_c] - (1-p(c))\log_2[1-p(c)] \quad (10)$$

Furthermore, the entropy for the binary "two time model" may be computed using the same method. The total entropy of a grid, H (M), may be defined as the sum of all individual cell "entropies". For a more complex grid which contains CFA, Slope, and Terrain Type, the entropy in each grid cell is based on the sum of the entropies of these components.

Equation 9 may also allow the process to correct the correlation assumption (i.e., the grouping of cells of the grid in the spatial model). If cells with the same probability distribution are 100% correlated, the error decreases as the trip progresses. An error reduction produces greater confidence in a chosen robotic path, ensuring safer routing and more accurate travel time prediction. If the correlation assumption does not hold, the error increases as successive cells of the same type are visited and found to be in different states. This may weaken the correlation assumption in the calculation (equation 8), which can adapt to information about the state of the grid, appropriately adjusting the predicted state of unexplored grid cells based on information obtained during the trip. The correlation assumption may be valid only in certain regions of the grid. In this case, the error term allows the robot to adapt to the changes in its environment. The error can increase or reduce the expected travel time. A negative error is added from the maximum P (t), giving a worst case uncertainty with regard to the state of the cell when path planning.

Routing a robot through a grid which contains uncertainty may also require a method to measure which routes are most likely to be effective. The objective of the robot dictates the effectiveness of a given route. In some cases, the objective is to explore the grid in order to minimize the uncertainty. In other cases, the objective is to move through the grid as quickly as possible.

Referring back to FIG. 4, the illustration of routing system 400 is not meant to imply architectural limitations to the manner in which different routing processes may be implemented. For example, routing system 400 may include other components in addition to or in place of the ones illustrated. As an illustrative example, routing system 400 may include a user interface to receive input parameters 408. In various embodiments, one or more parameters associated with reward and cost components of the utility function (discussed above) associated with different paths may be used for identifying the optimal path for traversing a terrain. For example, the optimal path may be defined based on the objective of the robot such as, for example, quickly traverse a terrain, resolve grid uncertainty, minimize energy expenditure, or the like (this may be identified based on input parameters, etc.). As such, the various parameters included in equations 2-9 may be adjusted based on the objective of the robot, and a path that maximizes the utility function for that objective may be chosen as the optimal path for the robot.

Furthermore, each robot may use a different set of parameters for its utility function. The robot may start in the initial grid position and move along the path which maximizes their unique utility function. Every time the robot moves into a cell with uncertainty, the actual state of that cell is observed and the travel time grid and probability grid (FIGS.

5B and 5C) are both updated. The robots share the information they uncover as they move along their paths by updating a global/shared data store. This data store may contain information about the known state of the grid. After each step, the travel times are recalculated, as is the utility function for the possible paths. Each robot then follows the newest path which maximizes their utility function. Each robot may continue this process until reaching the destination. In other words, the spatial model 404 may be a dynamic model, which is updated as data or observations are received with respect to the terrain modeled by spatial model 404.

In certain embodiments, routing system 400 may be distributed in different locations. For example, routing process 402 may be located in one location, while spatial model 404 and robot model 406 may be located in other locations. In yet other embodiments, spatial model 404 and robot model 406 may be combined into a single model. Further, in other embodiments, other robot models may be present in addition to robot model 406 to provide models for other types of robots. This type of implementation allows routing system 400 to provide paths (such as path 410), information learned by a robot, etc. to multiple other robots.

Figure 6:
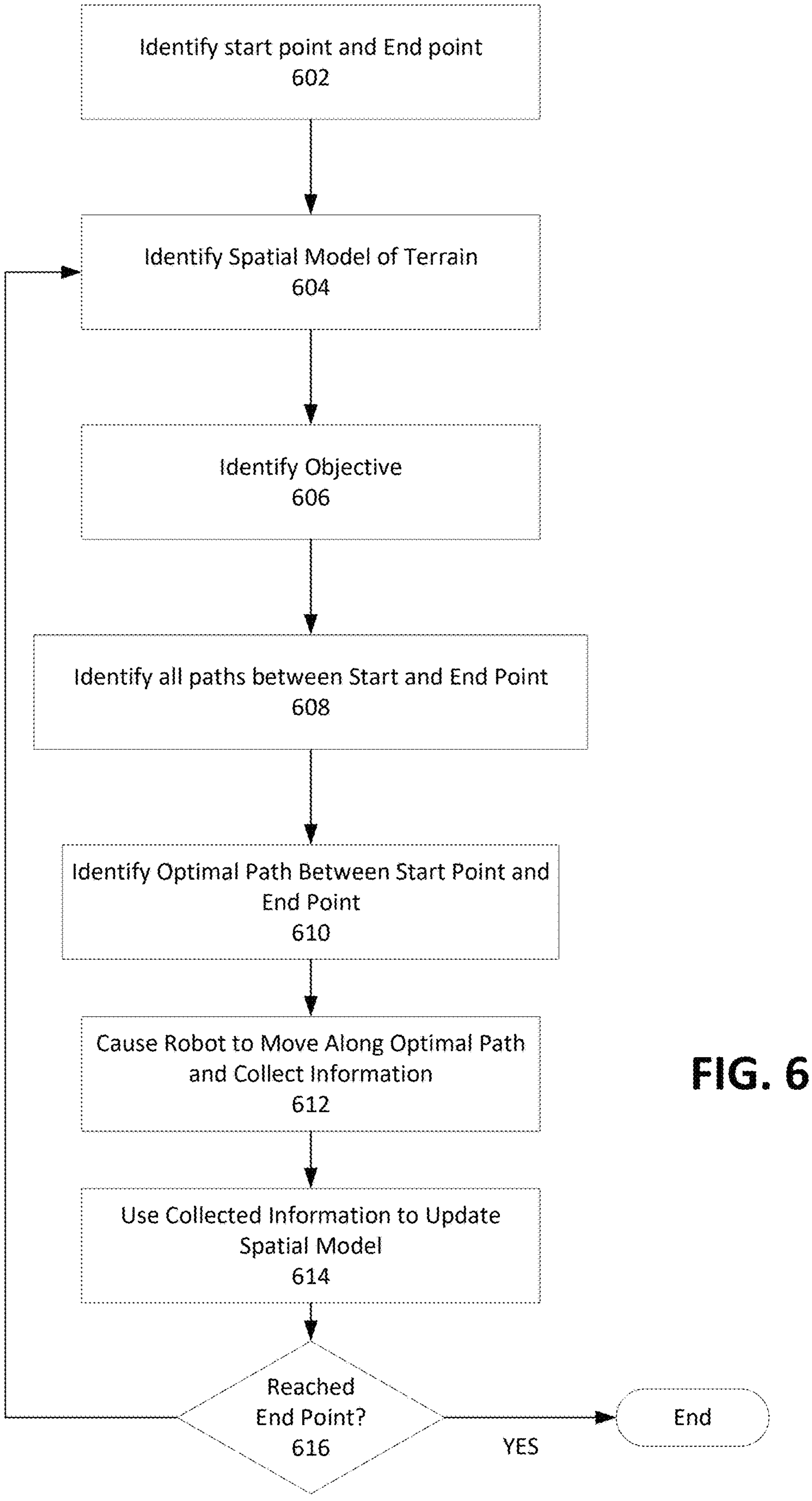
FIG. 6 provides a flow diagram that is useful for understanding an illustrative method for generating a path for a robot and updating a spatial model of a terrain.

Referring now to FIG. 6, a flowchart illustrating an example method for generating a path for a robot for maximizing information gain (given uncertainties), and updating a spatial model of a terrain is shown. The process illustrated in FIG. 6 may be implemented in a software component such as, for example, routing process 402 in FIG. 4.

The process begins by identifying a start point and an end point for a robot (602). The start point and the end point may be the start and end points for an entire path of the robot. In other advantageous embodiments, the start point and the end point may be a subsection of a path for the robot.

The process identifies a spatial model of terrain (e.g., from a data store) encompassing the start point and the end point to form an identified spatial model (604). As discussed above, the spatial model includes a grid where each cell is associated with a probability distribution of travel time through that cell (state). The probability distribution may be used to derive a minimum and maximum travel time, and probabilities associated with the minimum and maximum travel times for each cell. The process may, optionally, identify groupings of cells within the grid (i.e., correlations) where correlated cells are assigned to the same group or type.

Optionally, the cells may also include a probability distribution corresponding to the uncertainty and/or accuracy corresponding to the state of the cell.

In various embodiments, the initial spatial model (including the uncertainty distribution) may be generated based on available information and the terrain that the robot will traverse. For example, when the robot is a planetary rover, initial information about the terrain may be obtained from existing databases (such as NASA databases). Such information may include, for example, a terrain probability map, the original HiRISE strip near the delta, CFA (rock abundance), DEM (Digital Elevation Maps), or the like. The information may be used to generate the spatial model. For example, for different types of terrains, an average driving speed per sol may be obtained as a function of CFA, DEM slope, etc.; which may subsequently be converted to travel times and associated probabilities for the grid cells.

At 606, the process may identify an objective for the robot. The process may identify an objective based on, for example, the robot model (e.g., available battery life, terrain features that can be traversed by the robot, etc.), the spatial model (e.g., uncertainties in the spatial model), and/or input parameters (e.g., user instructions). For example, if the battery power of the robot is running low, the objective may be identified as reaching the destination point before the robot loses power. In another example, if the uncertainties in the spatial model are determined to be greater than a threshold (overall and/or at least a portion), the objective may be determined to be resolving uncertainties in at least some of the portions of the terrain.

The process may then identify all possible paths between the start point and the end point using, for example, a depth first search (608). At 610, the process may use the spatial model and the robot objective to identify an optimal path between the start point and the end point. For example, the process may identify a utility function for each of the paths, and identify the path that maximizes the utility function as the optimal path (as discussed above).

The process may then cause the robot to move to a first grid cell along the optimal path and collect information corresponding to the state of that cell (612). The process may use the collected information to update the spatial model (614). For example, the process may use the collected state information to update, in the spatial model, the state of the visited cell in the grid, updated the state of other cells that are correlated to the visited cell, update the correlation information, increase or reduce the error associated with the uncertainty probability distribution of the spatial model, or the like. Optionally, the process may store the updated spatial model in a data store.

The process may then repeat steps 604-616 until the robot reaches the destination point (616).

It should be noted that the process of FIG. 6 may be used for identifying drop locations (i.e., a first cell for collecting information in a grid) and/or for generating an optimal path for a robot in any configuration space such as astronomical bodies, hurricanes, heavily forested areas, or other spaces for which there exists uncertainty about the initial state of the cells of a grid that corresponds to the configuration space.

As discussed above, in a multi-robot scenario, each robot may use a different set of parameters for its utility function. The robot may start in the initial grid position and move along the path which maximizes their unique utility function. Every time the robot moves into a cell with uncertainty, the actual state of that cell is observed and the travel time grid and probability grid (FIGS. 5B and 5C) are both updated. The robots in such multi-robot scenarios share the information they uncover as they move along their paths by updating a global/shared data store. This data store may contain information about the known state of the grid. After each step, the travel times are recalculated, as is the utility function for the possible paths. Each robot then follows the newest path which maximizes their utility function. Each robot may continue this process until reaching the destination. The utility functions strategy profiles are applied in a Markov game defined by states, S, that is represented by the number of robots, N, with states mapped to a set of actions, A, by the state probability function. Some example utility functions are: (i) Utilitarian to maximize the sum of all the robots used utilities; (ii) Egalitarian to single out the robot with the has lowest utility function value and maximize its utility; and/or (iii) Inegalitarian to maximize the differences of the utilities between two groups of robots. One or more of the utility functions may be used when initially deploying robots for learning and exploration.

Figure 7A:
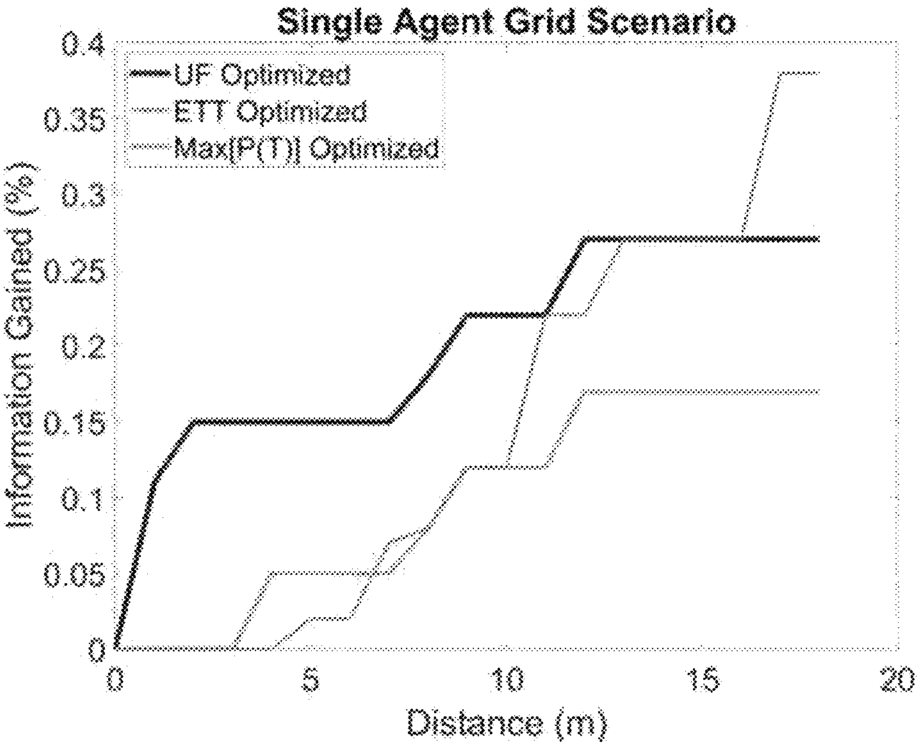
FIGS. 7A and 7B illustrate an example information gain by a robot as it moves along an optimal path as it moves through the example grid shown in FIG. 7C.
Figure 7B:
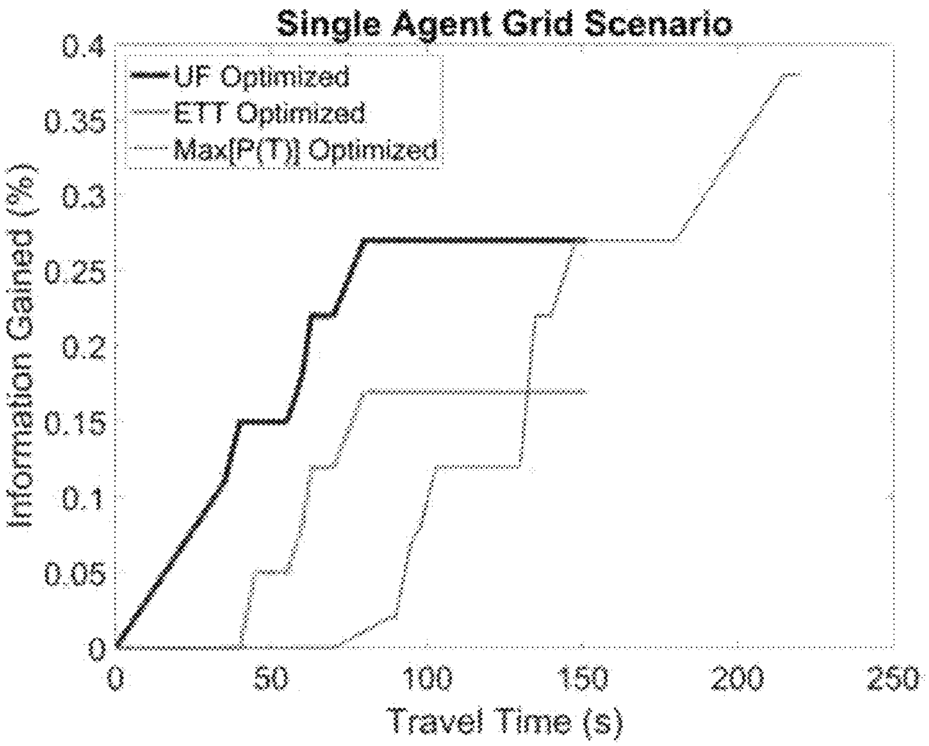
Figure 7C:
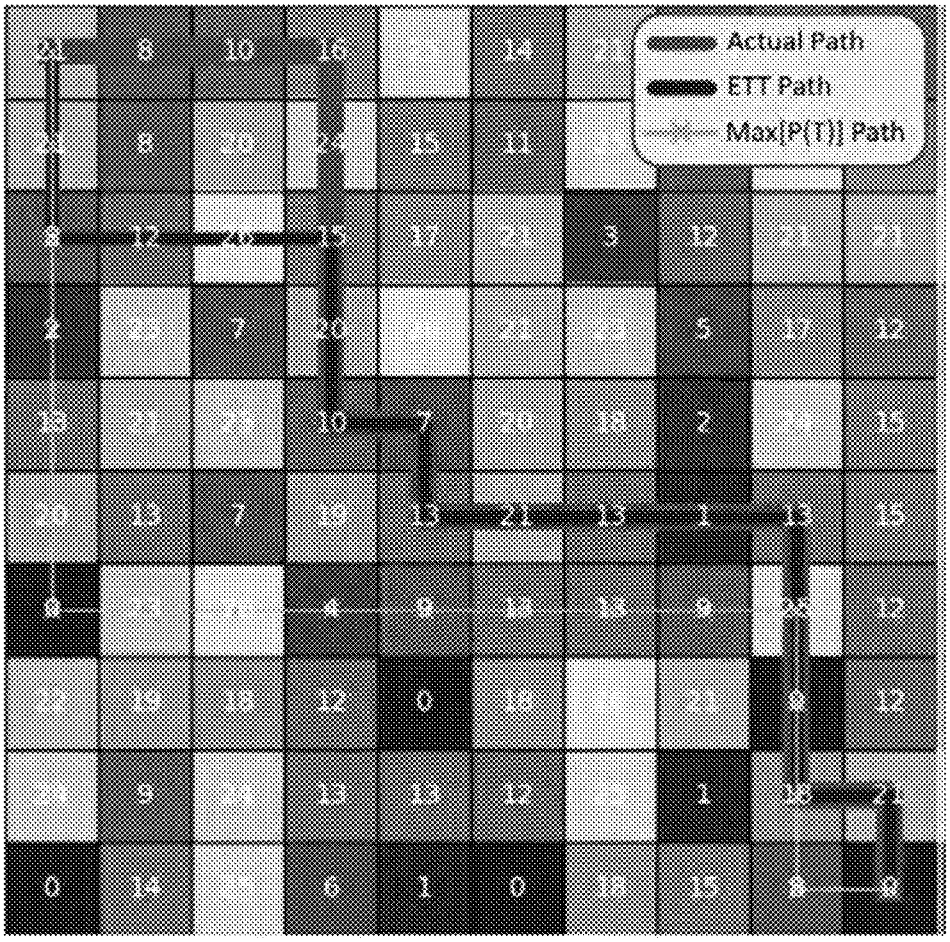

As discussed above, the systems and methods of this disclosure allow a robot to determine an optimal path that allows for explorations for resolving uncertainties in information available about a terrain. For example, FIGS. 7A and 7B illustrate an example information gain by a single robot as it moves along an optimal path as it moves through the example grid shown in FIG. 7C, as determined using the disclosure. The information gain over distance plot is shown in FIG. 7A and information gain over time is shown in FIG. 7B. The three paths used to generate the information gain plots are shown in FIG. 7C. These results were obtained with $\lambda_j=0.1$ (selected for strongly discouraging exploration late in the path because exploration early in the trip is generally more valuable than exploration late in the trip since there is more opportunity to utilize information gathered early on in the trip). As shown in FIG. 7C, an initial state of certain cells was known at the start of the trip. By the end of the trip, the state of a large number of grid cells was known, including the state of all of the cells along the fastest ETT path. As shown, the actual robot path is slightly faster than the "fastest ETT path" despite gathering more information along the way. In this example, the optimized robot's path also discovered the state of all cells along the fastest ETT path by visiting identical correlated cells in other locations early in its path. The path is planned in advance and updated as information about the grid is discovered.

Moreover, as robots discover the state of the grid, that information is conveyed to the other robots. Each robot updates its path plan every time it moves to a new grid cell. By sharing information about the state of the grid cells, the each robot helps to define the optimal parameters to be used in the other robot's utility functions. If an identical cell is visited by another robot and found to be in the same state as the original cell of that type, then all robots have confirmation that the assumption that these cells are correlated is more likely to be true. The proposed systems and methods allow for use of partial terrain information during path planning. Moreover, partial information may be extended to sequential information gain, and further extended to information gain considering multi-robot information sharing.

Optionally, using a separate agent (e.g. an aerial drone) to observe the grid in advance of a terrestrial robot's (e.g., a rover) arrival may allow several changes to the algorithm. For example, the need to obtain information as early as possible during the path plan may be relaxed relaxed, the Shannon Entropy may be replaced with Standard Deviation to allow the reward component to be simplified to the weighted sum of the reduction in standard deviation over the path. This results in Equation 11 for agent i, path p, cell j, and time t:

$$U_{i,p,t} = \sum_{j=0}^{End}\left[W_{j,1}(SD_{prior} - SD_{posterior}) - W_{1,2cost_{i,p}}\right] \tag{11}$$

Figure 8:
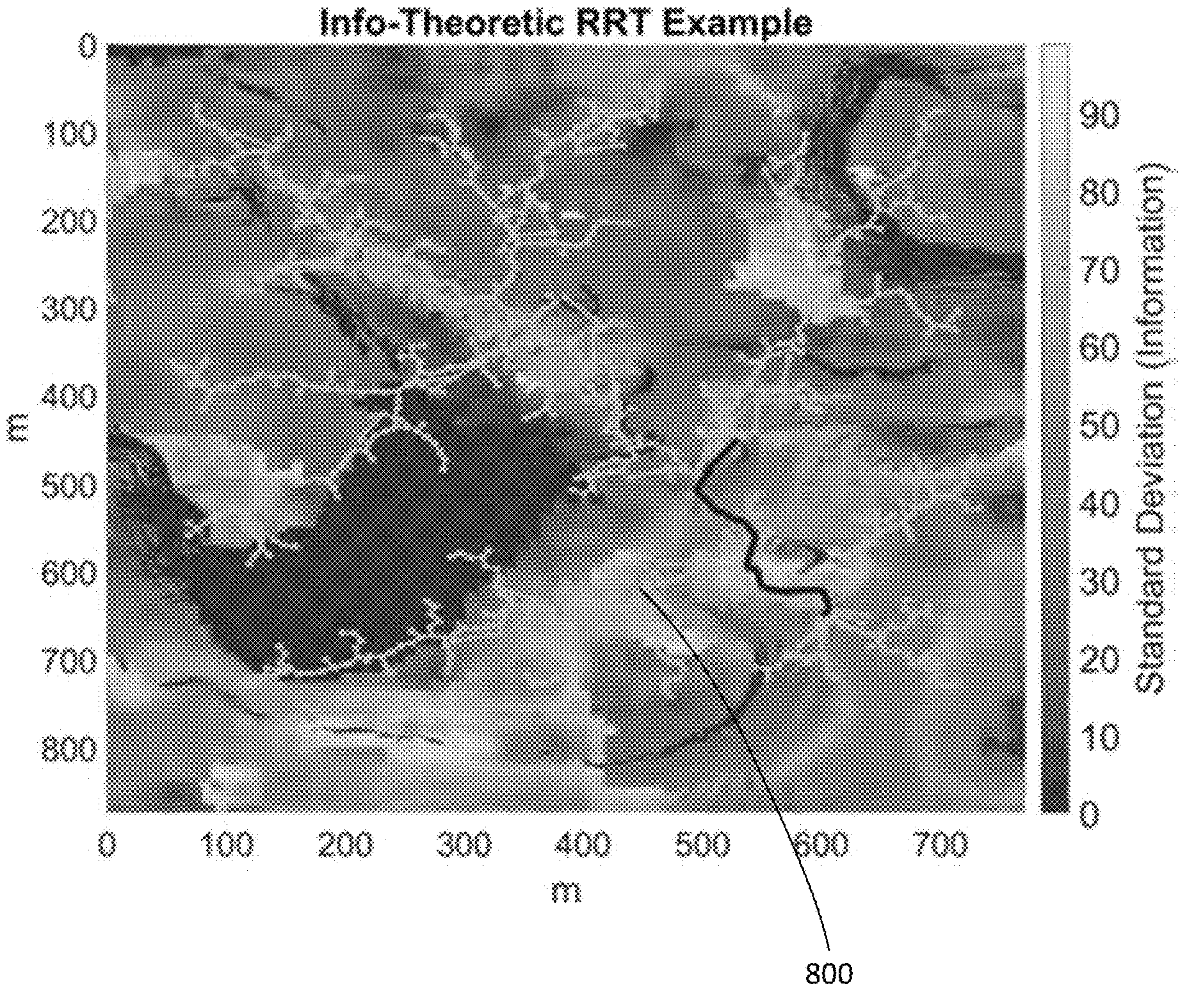
FIG. 8 illustrates an example a tree growing along the routes of greatest utility in terms of travel cost and information gain for an aerial drone on an example Mars terrain.

In the above disclosure, the utility function-based algorithm considers a single agent (i.e., rover) gaining information as quickly as possible in order to improve its travel time. This requires obtaining the maximum amount of information early in the trip while balancing the computational cost of obtaining that information in terms of added travel time. In the case of the Rover-Helicopter team, the disclosure may be extended to a multi-agent case where the single agent seeking to gain information is the helicopter. The information gathered by the helicopter is beneficial to reducing travel time for the rover. In a real-world scenario on Mars, the helicopter can be assumed to travel much faster than the rover and its flight times are extremely short (several minutes) relative to the time scales involved in moving the rover (¡200 meters per 24.66 hrs). Therefore, the process can be approximated as a two-stage process, or a series of two-stage processes, in which the helicopter first obtains information and the rover then proceeds along its path using information obtained by the helicopter and/or satellite imagery information. Because of the lack of a defined destination location for the drone and/or the intractability of solving for all possible paths on large scale maps, the utility function for the drone may be defined by, for example, equation 11. FIG. 8 illustrates a tree 800 growing along the aerial drone's routes of greatest utility in terms of travel cost and information gain for ground rovers on the Mars terrain, as computed using the current disclosure.

This disclosure offers systems and methods for single and multi-agent path planning in uncertain environments. The information gained by the agent can provide significant travel time savings over the initially planned path if the initial path plan traverses highly uncertain cells. Another benefit of this methodology is that it enables a single agent to perform more non-driving related (e.g. Scientific exploration) tasks without a substantial increase in true travel time over the expected travel time. For a Mars rover, this could mean being able to visit and observe more types of terrain and gain significantly more scientific information while still arriving at the goal location on time (without incurring substantial risk).

In a multi-agent scenario, a drone may be the first agent to traverse the map using the above disclosure, while the rover benefits from this information by planning a path which is more optimal. Specifically, the drone allows safe information gain for a ground-based rover without excessive computational cost. When the helicopter updates information, the rover takes advantage of the new information while considering the error and updates its path. This methodology provides better routing and extends travel distance allowing more time for the over to perform non-driving research activities.

In various embodiments, path decisions for multiple pairs of uncertain and risky surface may generate more benefit over single pairs. Hierarchical reinforced learning may also be developed where each cell in a grid generates different reward generated from choosing less-traversable surface. This is the minimum cost of trying non-traversable path and taking a detour.

Figure 9A:
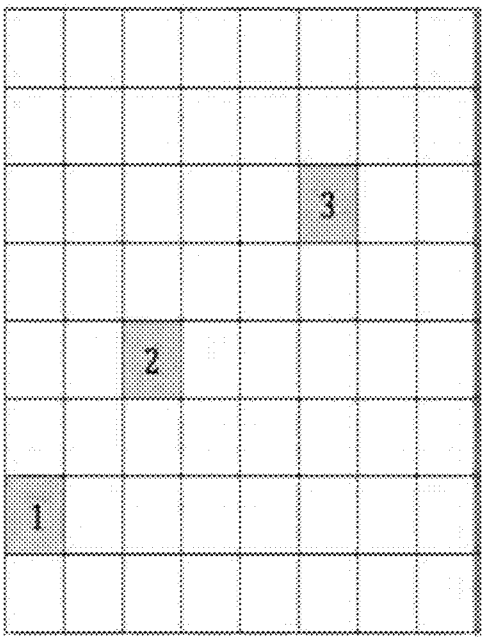
FIG. 9A illustrates an example single observation information gain.

Single observation (e.g., one of CFA, terrain type or rock abundance): In some scenarios, by making a single observation in each grid cell, the amount of time spent in the cell may be reduced (shown in FIG. 9A). This benefit is offset by less information gain from each cell. Making a single observation results in partial information gain, improving the predicted optimal path. Solutions for traversable scenarios may be generated by generating sub-paths having different travel time options to obtain a time optimal path. The travel time difference between paths as a result of knowing sub path information is captured.

Figure 9B:
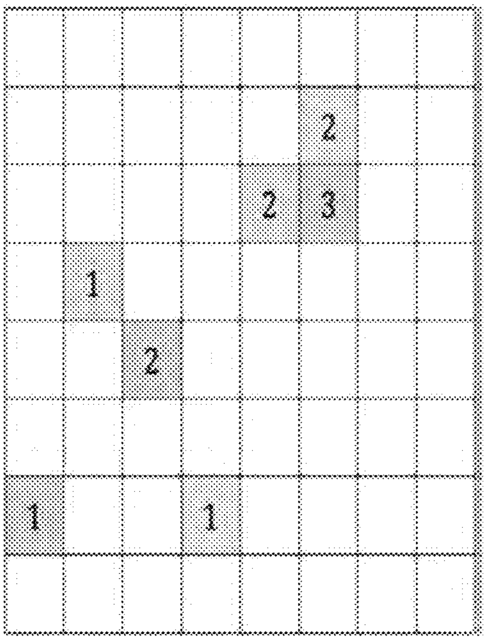
FIG. 9B illustrates an example of sequential information gain in a multiple probability distribution environment.

A sequence of multiple observations (e.g., each of terrain type, Slope, CFA) A route-guided Markov decision process MDP may be developed to compare paths including "A" and not including "A". This generates a limited set of paths as disclosed herein. The current action is based on the current reward. Terrain types, slope, and CFA are visually classified using different colors, one for terrain type, one for CFA, and one for slope (as shown in FIG. 9B).

Figure 9C:
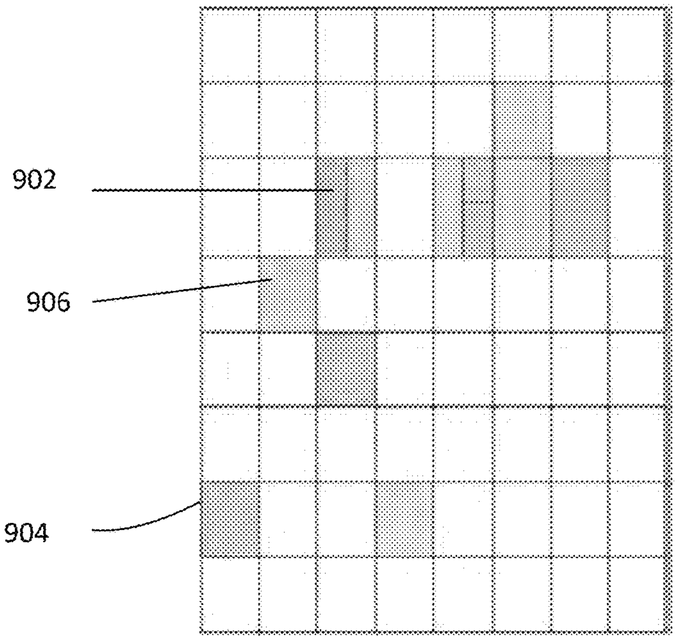
FIG. 9C illustrates an example of sequential information gain in a mixture probability distribution environment.

A mixture of information gain:

Multiple Univariate Probability Distributions: In a sequence of visits to correlated cells, information is partially gained. In a first visit, the observation only gives a clue about slope, with no information on CFA or terrain type of the other correlated cells. Conditional distribution based on attributes may be made, such that decisions are made in partially observable environment. By making visits to correlated cells, more information may be obtained. FIG. 9C demonstrates the concept of sequential information gain in a multiple univariate probability distribution environment. Consider a cell 902 which contains a distribution of terrain types (Red and green). Visiting a red terrain type cell (e.g., cell 904) removes uncertainty only with regard to the red terrain portion of the red/green cell 902. If both red terrain and green terrain cells (e.g., 904 and 906) are visited, then both the red and green portions of the red/green cell 902 are known. The information gain with regard to the terrain type variable does not extend to information gain with regard to the slope or CFA in the red/green cell. Each variable is observed independently in this model, and the optimal path planned accordingly.

Multi-variate Probability Distributions: Consider a model with four possible surfaces, A, B, C, and D. These terrain surfaces may each be defined by, for example, three variables (Terrain type, CFA, and slope). In an example, surface type A is smooth regolith having 17% CFA and a slope of 16 degrees; Surface type B is a rough outcrop with 15-19% CFA and a slope of 30+ degrees; Surface type C represents linear ripples with 20-25% CFA and a slope of 15-19 degrees; and Surface type D represents smooth regolith with 30+% CFA and a slope of 30+ degrees. Based on the assumption of joint entropy in a multi-variate probability distribution, the reward of visiting D after visiting A, B or C in any order can be computed—e.g. for three scenarios: visiting D after only visiting A, after visiting both A and B, and after visiting A, B, and C. The information gain and travel time performance of these scenarios are then compared.

Implementation to Energy aware MDP with information gain: Driving energy prediction can be made. The benefit of uncertainty reduction in speed are converted to energy consumption and continuous charging problem. Affine energy functions for three terrain types identified by machine learning. The existing effort, Autonomous Exploration for Gathering Increased Science (AEGIS), autonomously targets and obtains measurements during periods of otherwise underutilized, stationary time such as at the end of drives. On the contrary, Drive-By Science is used to generate science findings during engineering-dominated time, such as while driving, by summarizing and compressing scientifically useful statistics from regularly captured images. Drive-By Science does not replace on-board targeting capabilities like AEGIS; rather these two capabilities can be used together to further enhance the science return of future rover missions. For example, with Energy-Optimal AutoNav, the rover will make spontaneous stops for charging batteries; AEGIS can be used to perform opportunistic, targeted science observations during those stops, while Drive-By Science can be used to perform untargeted science between stops. Machine learning-based classification from onboard computing and ground scientist are used, with output as probabilities. A classification algorithm is compared to flight-proven AEGIS and Generative Adversarial Network (GAN), which is a deep learning method that automatically learns a mapping between the distribution of image observations and semantic descriptions. In addition to considerations of time and information gain, routing considers the expected energy input based on time and location in the grid, expected load, and battery charge level. The model is based on the following objective function:

$$\min_{\pi\in\prod} E\sum_{t=0}^{T} C(S_t, X_t^\pi(S_t)) \tag{12}$$

where and C is the cost at time t in terms of travel time and speed.

The state space is defined as location, time, battery charge level, and the status (Driving or sleeping). Action space is defined by movement in one of four directions (North, South, East, and West) as well as remaining in place for one of two reasons (Stay or warmup) for an optimal policy as following:

$$X_t^\pi(S_t|\Theta) = \mathrm{argmin}_{x\in X_t}\left(C(S_t, x) + \sum_{f\in f}\theta_f \phi_f(S_t, x)\right) \tag{13}$$

where f are the forecasted values. The decisions, $x_t$ are constrained by:

$$x_t^{EL} + x_t^{EB} \le E_t$$
$$x_t^{GL} + x_t^{EL} + \eta x_t^{BL} = L_t$$
$$x_t^{BL} \le R_t$$
$$x_t^{EB}, x_t^{GB}, x_t^{BL} \le \rho_{chrg}$$
$$x_t^{GL}, x_t^{EL}, x_t^{EB}, x_t^{BL} \ge 0$$

where G is the grid, L is the load, B is the battery storage, E is the level of energy received from the sun, R is the total amount of energy in storage, η is the rate of energy loss, and $\rho_{chrg}$ is the fixed charge/discharge rate. The first constraint states that the flow of energy from the solar panel to the load, plus the flow of energy from the solar panel to the battery must be less than or equal to the level of energy from the solar panel at time t. In other words, energy input to the system is bounded by the total energy input from the energy source for following decisions.

$$x_t = \left(x_t^{GL}, x_t^{GB}, x_t^{EL} x_t^{EB}, x_t^{BL}\right) \tag{14}$$

By formulating utility functions which balance the trade-off between exploration and exploitation, the current disclosure provides for time-dependent path planning with single or multiple autonomous agents. In the model framework, each grid cell (e.g. Image pixel) contains the unique probabilistic distribution of travel time, allowing the formulation of path plans under a partial information environment. Invaluable knowledge and insights may be derived regarding correlation between cells of the grid environment and integrating different sources of information gain.

While the above disclosure describes the generation of a route for a robot, the disclosure is not so limiting, and the principles disclosed herein may be used for other application as well. Examples may include, without limitation, navigation of delivery vehicles in under untraversable side-walk condition with and without adverse weather, data collection corresponding to a hurricane, or the like.

For example, lack of high-resolution observations at the inner-core region of hurricanes introduces uncertainty into the structure's true initial state. More accurate measurements at the inner-core are essential for accurate hurricane forecasts. The principles of this disclosure may be used to improve the estimates of the inner-core structure by utilizing background information from prior assimilated conventional observations for providing a scheme for targeted high-resolution observations using aerial drones such as the Coyote small unmanned aircraft system (SUAS). Such sampling based path planning algorithm that considers the aerial drone's energy usage and locates the regions of high uncertainties along the drone's flight, allows for maximization of the removal of uncertainties, which may be used to provide improvements in estimates of the hurricane structure after the resolution of uncertainties at targeted locations.

Specifically, current drone path planning methods do not consider how data gathered from a flight path impacts and improves prior in situ observations, critical for inner-core initialization. However, aerial drones have limited endurance and range, and must consider how traversing a given path, or flight pattern will maximize the resolution of uncertainties in previous assimilated data models. These uncertainties can provide background information for targeted high-resolution observations to maximize the removal of uncertainties in the prior estimates, providing a more accurate approximation of the inner-core structure. In addition, current drone navigation does not consider how the path affects the limited battery life (critical for observations and communication) and total distance covered by the drone. For instance, flying at certain angles to the direction of the hurricane wind velocity will severely impact battery usage. A flight pattern that strives to reduce the energy utilized for navigation will improve the range for observations. The current study seeks to reduce the energy utilized for navigation and improve the distance covered by the SUAS by flying as close as possible with the drift of hurricane winds.

The highly dynamic environment of a hurricane configuration space is mainly described through the wind velocities. To provide easy maneuverability for drones in such environments, the current disclosure may be used to provide an efficient path solution that results in a rapid exploring and collision-free path. The process may start with a tree that includes the initial drop off location of the drone as its single vertex and no edges. The algorithm then incrementally grows a tree on the hurricane configuration space by randomly sampling a location within the space and extending it towards that location. This study uses Equations 15-20 to model the drone's flight for targeted observations. The observations are characterized by the uncertainty distribution of three state variables, namely pressure, temperature, and wind speed (mainly because of the current capabilities of the drone). Based on the aforementioned state variable uncertainties, a combined representation of the uncertainties at different locations in the hurricane configuration space is developed through a linear weighted average of the three individual uncertainty distributions. The combined representation for uncertainty C, at location i in the hurricane's configuration space is therefore written as:

$$\hat{C}_i = W_P\hat{x}_i^P + W_T\hat{x}_i^T + W_W\hat{x}_i^W \qquad (15)$$

where, $\hat{x}_i$, $\hat{x}_i$, $\hat{x}_i$, are the normalized uncertainties for pressure, temperature, and wind speed uncertainty, and $W_P$, $W_T$, $W_W$, are the weights for pressure, temperature, and wind speed uncertainty. The normalized uncertainties for each state variable $x_i$ at location i is:

$$\hat{x}_i = \frac{x_i - x_{min}}{x_{max} - x_{min}} \qquad (16)$$

where, $x_{min}$ and $x_{max}$ are minimum and maximum uncertainty for the given state variable. The weights for the state variable uncertainty sums to one, written as:

$$W_P + W_T + W_W = 1 \qquad (17)$$

The above uncertainty associated with the hurricane's configuration may be used to generate a drop locations and/or pathway for the drone. Optionally, the objective may be to maximize energy efficiency for maximum distance travel as well as to maximize information gain to improve an initial Hurricane model. For example, the methods may include simulating an initial hurricane prediction model using satellite image data regarding for example environmental conditions to generate a predicted hurricane path and/or wind velocity. However, the hurricane prediction model includes prediction errors as well as uncertainties (discussed above) in the hurricane configuration space. As such, the methods of this disclosure may be used to charter drop-off locations and flight path of the drones such that the drone(s) prioritize visiting locations in the hurricane configuration space where the uncertainty is high for collecting observations in order to maximize information gain useful for reducing uncertainty. In addition, as discussed above change in uncertainty of a location based on observed data may be used to reduce the uncertainty of other correlated but distant locations that the drone has not actually visited. The information gained about such correlated cells may be used to update the predicted hurricane path and/or wind intensity (and, optionally, to update the initial hurricane prediction model).

In various embodiments, the process may include determining spatiotemporal network correlation between cells within the hurricane configuration space that have a multimodal distribution determined based on granular microscopic data from multiple source. The global and local posterior gains from new observations (collected by drones) may be estimated by updating the prior distribution of correlated cells. The global correlation between non-contiguous cells of an entire map may be estimated by using an expectation maximization algorithm on their multimodal mixture distributions. Additionally and/or alternatively, the local and temporal correlation may also be estimated using a Local Global Unscented Transform (UT) Kalman Filter. The output of Kalman Filter may be estimated event network and/or multimodal nested sampling. Information gained at the exploration of a cell may be used to update the posterior distributions of all correlated cells. Specifically, this process will improve the state estimation of unobserved locations in a hurricane when navigating environments in which prior belief information is provided but contains high uncertainty (shown in FIG. 11).

Figure 11:
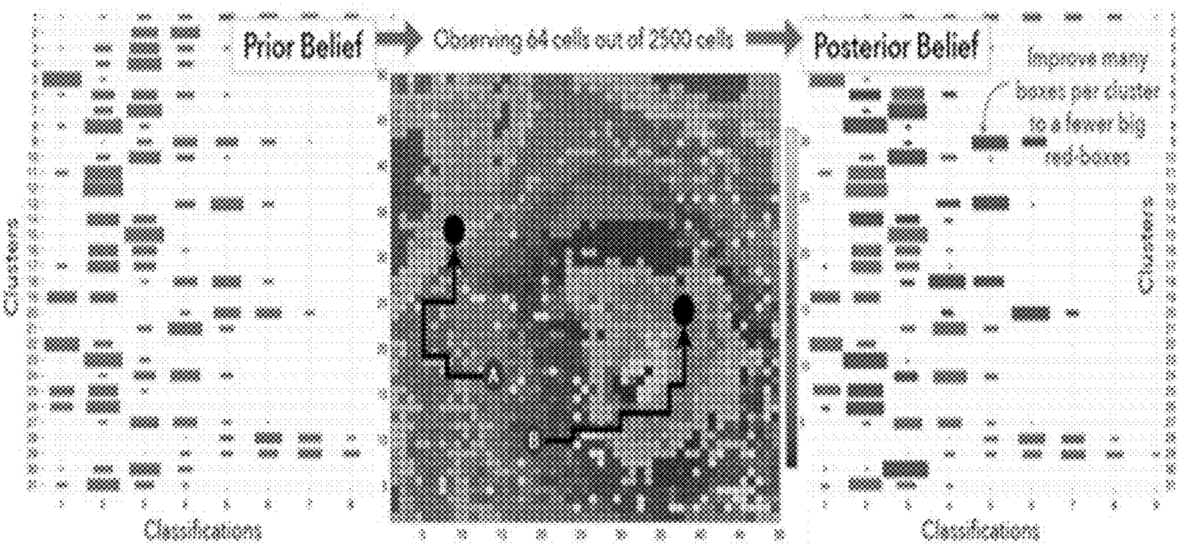
FIG. 11 illustrates example information gain using the methods disclosed in this disclosure.

FIG. 11 illustrates posterior update after robots A and B depart from red circles and observe 64 geographical cells out of 2500 cells. Using variational Bayesian inference, the belief about the properties of different cell type clusters will be updated en route to improve the travel. Clustering will be performed using an expectation maximization algorithm on a multinomial mixture models of the cells to identify cells with similar probability distributions. The likelihood of observing the dataset P(γ|α,β) for data γ goes from 1 to N and Dirichlet parameters α,β. Using Expectation Maximization, the optimal distribution of the data over K clusters will be determined by maximizing the lower bound of the log of the likelihood. The optimal cluster index, e.g., 31 in FIG. 11, minimizes the Bayesian information criterion.

For initial clustering of correlated cells in a hurricane configuration space, continuous variables may be assigned into different categories in the form of a probability for a class label to accommodate heterogeneous dynamics in each cell (e.g., fine-grain travel time data every 300m from North Carolina DOT). Cells that have similar combinations of data may be clustered. For illustration, considering a 12-hour forecast window for Hurricane Harvey, the clustering technique may classify nine identified wind speed categories into 31 clusters. The uncertainties in estimating the wind speed at different grid points can lead to wrong track and intensity forecasts for tropical cyclones. Although unobserved non-contiguous cells may not share any inherent correlation with locally observed cells, classification errors may be correlated with certain features found in different locations. By clustering cells with similar wind speed characteristics and correcting those errors using information gain algorithms included in this disclosure, the reliability of the prediction may be improved.

In example embodiments, the main objective is to find random nodes that lower the overall energy for a given path but maximizes the uncertainty removed along the path to a target location. A wind velocity constraint is implemented as the acceptable angular difference between a sub-path segment of the tree and the wind velocity at location i. This ensures that minimal energy is utilized for navigation. An angular difference condition may, without limitation be set at less or equal to 50° (allowing some room to navigate around the direction of the wind). The set of all the configurations satisfying the wind velocity constraints may be written as:

$$H_{CON} = \{q | f_i(q) \le e_i\},\ e_i \in (0, 50),\ \forall\ i \ge 0 \tag{18}$$

$H_{con}$ is hurricane configuration space and $f_i(q)$ is:

$$f_i(q) = \cos\alpha = \frac{\overline{a}_i - \overline{b}_i}{|\overline{a}_i| \cdot |\overline{b}_i|} \tag{19}$$

where $\overline{a}_i$ and $\overline{b}_i$ are the wind and tree branch at location i.

Figure 10:
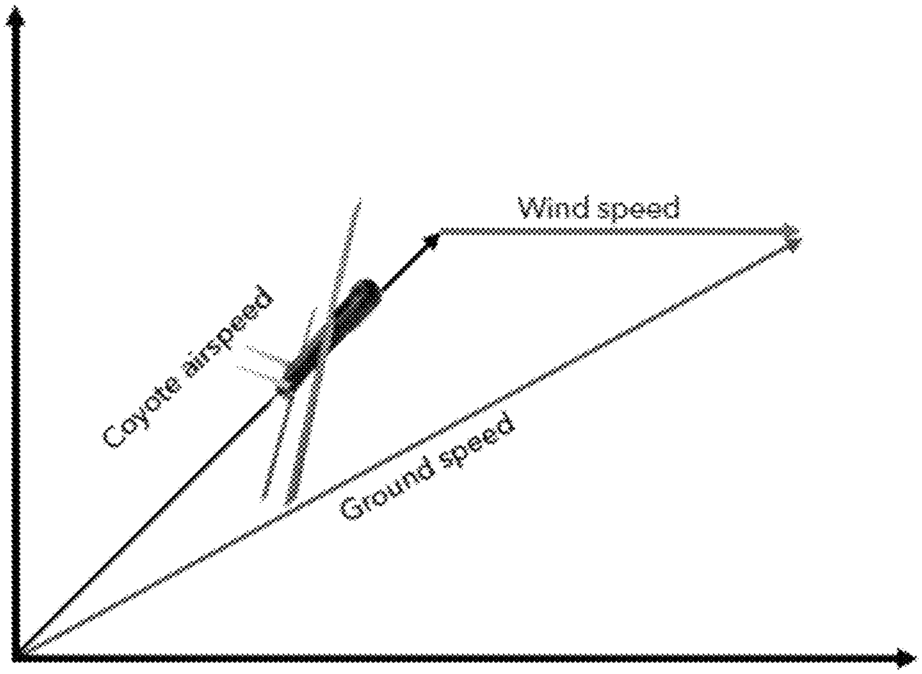
FIG. 10 illustrates an example representation of the speed of a drone relative to a fixed point on the Earth's surface.

An end result of the wind velocity constraint is an increased range of coverage by the drone for the same endurance. The speed of the drone relative to a fixed point on the Earth's surface (ocean) is the ground speed (FIG. 10). The velocity of the drone thus given as the vector sum of the drone airspeed and the hurricane wind speed, written as:

$$V_{Ground} = V_{Drone} + V_{Wind} \tag{20}$$

Figure 12:
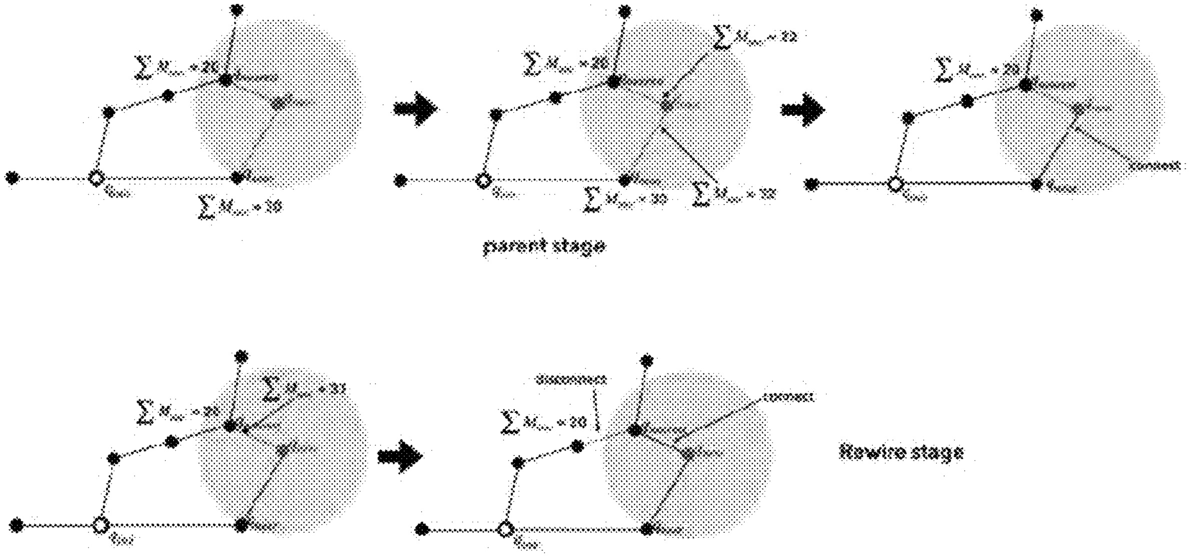
FIG. 12 illustrates the process for extending a new vertex for an example optimal path planning of a drone for collecting information within a hurricane.

The process may first extend a nearest-neighbor vertex towards a randomly sampled location in the hurricane configuration space. The extension process creates a new vertex $q_{new}$, at a distance≤to a defined step size. The algorithm then connects $q_{new}$, to the vertex that incurs the maximum total uncertainty ($M_{unc}$) from the start location within the set of vertices found in a defined vicinity around $q_{new}$ (parent stage). The process also reevaluates previous connections and extends the new vertex to the vertex that can be accessed through the maximum uncertainty, described as the rewire stage. At the point of rewiring, the process searches among all existing nodes within the defined vicinity of $q_{new}$. This process is illustrated in FIG. 12. Furthermore, as discussed above, any information gain at a node is imputed to correlated nodes.

Figure 13:
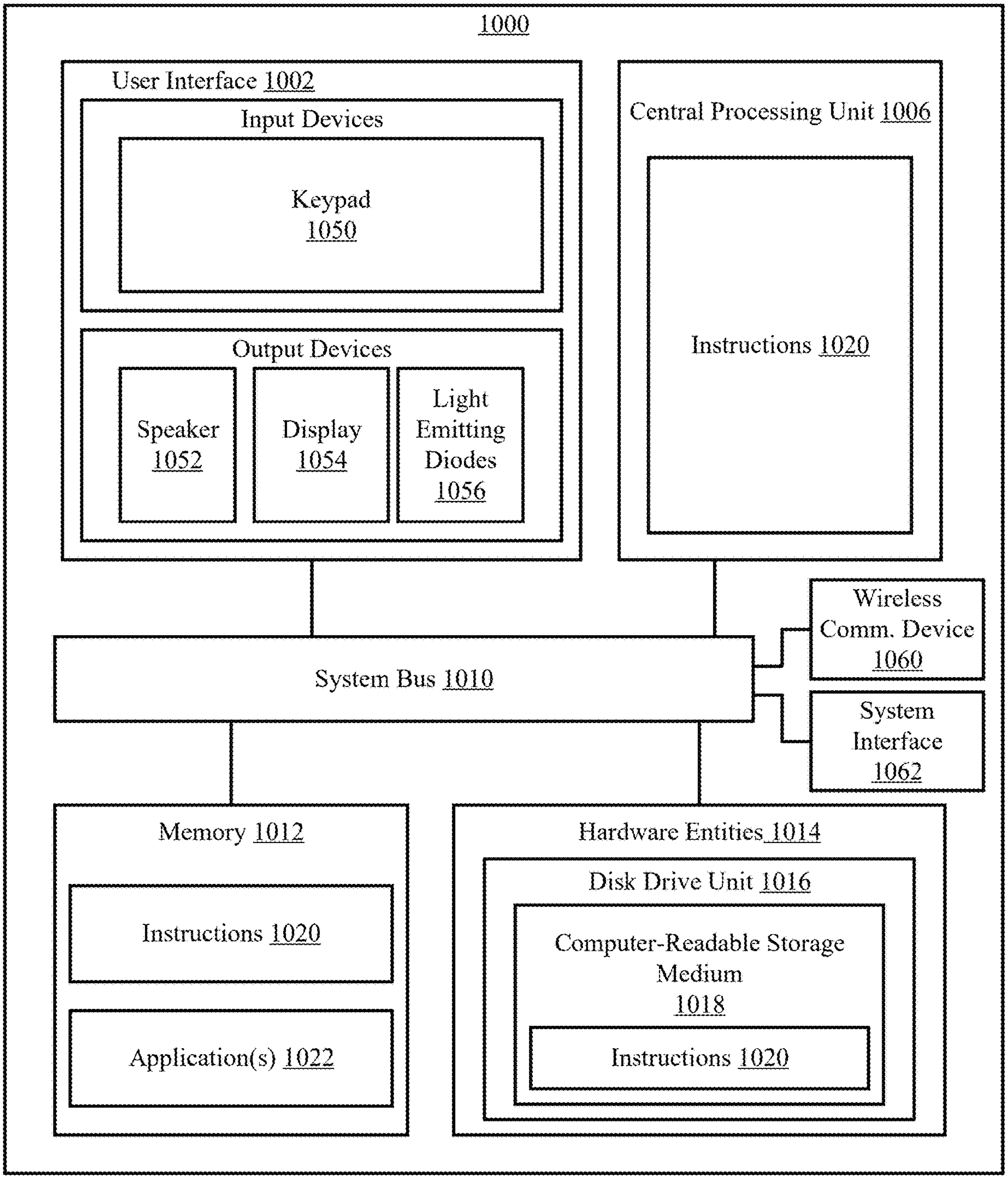
FIG. 13 provides a block diagram that is useful for understanding the illustrative architecture of a computing device.

Referring now to FIG. 13, there is provided an illustration of an illustrative architecture for a computing device 1300. The computing device 113 of FIG. 1, the on-board computing device 212 of FIG. 2, the routing system 400 of FIG. 4 is/are the same as or similar to computing device 1300. As such, the discussion of computing device 1300 is sufficient for understanding the various internal hardware that may be included in any of the electronic components of the system.

Computing device 1300 may include more or less components than those shown in FIG. 13. However, the components shown are sufficient to disclose an illustrative solution implementing the present solution. The hardware architecture of FIG. 13 represents one implementation of a representative computing device configured to operate a robot, as described herein. As such, the computing device 1300 of FIG. 13 implements at least a portion of the method(s) described herein.

Some or all components of the computing device 1300 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 13, the computing device 1300 comprises a user interface 1302, a Central Processing Unit (CPU) 1306, a system bus 1310, a memory 1312 connected to and accessible by other portions of computing device 1300 through system bus 1310, a system interface 1360, and hardware entities 1314 connected to system bus 1310. The user interface can include input devices and output devices, which facilitate user-software interactions for controlling operations of the computing device 1300. The input devices include, but are not limited to, a physical and/or touch keyboard 1350. The input devices can be connected to the computing device 1300 via a wired or wireless connection (e.g., a Bluetooth® connection). The output devices include, but are not limited to, a speaker 1352, a display 1354, and/or light emitting diodes 1356. System interface 1360 is configured to facilitate wired or wireless communications to and from external devices (e.g., network nodes such as access points, etc.).

At least some of the hardware entities 1314 perform actions involving access to and use of memory 1312, which can be a Random Access Memory (RAM), a disk drive, flash memory, a Compact Disc Read Only Memory (CD-ROM) and/or another hardware device that is capable of storing instructions and data. Hardware entities 1314 can include a disk drive unit 1316 comprising a computer-readable storage medium 1318 on which is stored one or more sets of instructions 1320 (e.g., software code) configured to implement one or more of the methodologies, procedures, or functions described herein. The instructions 1320 can also reside, completely or at least partially, within the memory 1312 and/or within the CPU 1306 during execution thereof by the computing device 1300. The memory 1312 and the CPU 1306 also can constitute machine-readable media. The term "machine-readable media", as used here, refers to a single medium or multiple media (e.g., a centralized or distributed database, and/or associated caches and servers) that store the one or more sets of instructions 1320. The term "machine-readable media", as used here, also refers to any medium that is capable of storing, encoding or carrying a set of instructions 1320 for execution by the computing device 1300 and that cause the computing device 1300 to perform any one or more of the methodologies of the present disclosure.

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:

1. A method for generating a robot path for navigating a terrain, the method comprising:
   - receiving a spatial model of the terrain, the spatial model comprising a grid comprising a plurality of cells, wherein each of the plurality of cells is associated with a travel time probability distribution;
   - identifying a plurality of paths between a start point and an end point on the terrain;
   - identifying, using the spatial model, an optimal path from the plurality of paths such that information about the terrain collected by a robot is maximized while traversing the optimal path, wherein the identifying the optimal path comprises:
     - determining, based on the spatial model, a utility function for each of the plurality of paths, the utility function being a measure of information that is gained about the terrain by visiting cells along that path, wherein determining the utility function comprises:
       - determining the optimal path for a sequential spatiotemporal information gain from different information sources of partial entropy comprising:
         - partially resolving uncertainties, for matching features between similar cells, relating to at least one feature of a plurality of features included in a mixture of information available relating to the terrain, wherein the partially resolving comprises estimating entropy in a subset of cells of the plurality of cells, the subset of cells being selected to have a state similar to that of the grid cell with respect to the at least one feature, and probabilistic posterior updates;
         - determining a time dependent error component for each cell included in a path to penalize for similarity with a previously visited cell similar to that cell through resampling cells with the same probability distribution;
       - and
     - identifying a path, of the plurality of paths, that maximizes the utility function;
   - causing a robot to move from the start point to a grid cell on the optimal path;
   - causing the robot to collect information about the grid cell; and
   - updating, using the collected information, the spatial model of the terrain to generate an updated spatial model.

2. The method according to claim 1, further comprising generating, after the updating, an updated optimal path for the robot using the updated spatial model.

3. The method according to claim 1, further comprising using the travel time probability distribution associated with each of the plurality of cells to determine at least one of the following: a minimum travel time for traversing that cell, a maximum travel time for traversing that cell, and a probability associated with either the minimum travel time or the maximum travel time.

4. The method according to claim 3, further comprising identifying from the plurality of cells, based on the minimum travel time, the maximum travel time, and the probability, one or more groups of correlated cells.

5. The method according to claim 4, wherein each of the one or more groups of correlated cells includes a subset of the plurality of cells that have identical minimum travel time, identical maximum travel times, and probabilities associated with either the minimum travel time or the maximum travel time that are within a threshold range.

6. The method according to claim 4, updating, using the collected information, the spatial model of the terrain comprises updating the travel time probability distribution of the grid cell and one or more cells identified as being correlated to that cell.

7. The method according to claim 1, wherein the utility function comprises a reward component that is determined for each cell included in a path based on at least one of the factors: a number of correlated cells associated with that cell; an uncertainty associated with the travel time probability distribution of that cell; or a difference between the minimum travel time and maximum travel time associated with that cell.

8. The method according to claim 7, further comprising determining the reward function for maximizing information gain early during traversal of the path.

9. The method according to claim 1, wherein the utility function comprises a cost component that is determined by comparing a difference in expected travel times between that path and another path that has a fastest expected travel time between the start point and the end point.

10. The method of claim 1, wherein the spatial model is received from another robot that has previously navigated the terrain.

11. The method of claim 1, wherein the spatial model is received from image data associated with the terrain.

12. The method of claim 1, further comprising receiving a robot model of the robot, the robot model being generated based on a location of the robot on the terrain and being indicative of at least one of the following energy usage, energy creation, or energy storage of the robot with respect to the spatial model.

13. The method of claim 12, wherein determining the optimal path further comprises determining the optimal path based on the robot model.

14. The method of claim 1, wherein determining the optimal path to partially resolve uncertainties relating to the at least one feature comprises using the collected information to update uncertainty associated with the grid cell and at least one other cell of the plurality of cells.

15. The method of claim 1, wherein the identifying the optimal path from the plurality of paths such that information about the terrain collected by a robot is maximized while traversing the optimal path comprises probabilistically combining a mixture of information about the terrain for maximizing information gain.

16. The method of claim 15, wherein probabilistically combining the mixture of information about the terrain comprises using multiple univariate probability distributions corresponding to one or more attributes of the terrain.

17. The method of claim 15, wherein probabilistically combining the mixture of information about the terrain comprises using multivariate probability distributions corresponding to one or more attributes of the terrain.

* * * * *